US012495265B2

(12) United States Patent
Yoshida et al.

(10) Patent No.: US 12,495,265 B2
(45) Date of Patent: Dec. 9, 2025

(54) INFORMATION PROCESSING DEVICE AND INFORMATION PROCESSING METHOD

(71) Applicant: SONY GROUP CORPORATION, Tokyo (JP)

(72) Inventors: Kazushi Yoshida, Tokyo (JP); Tatsuya Tamaki, Kanagawa (JP); Izuru Tanaka, Kanagawa (JP); Mitsutoshi Aoyagi, Saitama (JP); Naoki Saito, Chiba (JP)

(73) Assignee: Sony Group Corporation, Tokyo (JP)

( * ) Notice: Subject to any disclaimer, the term of this patent is extended or adjusted under 35 U.S.C. 154(b) by 182 days.

(21) Appl. No.: 18/253,090

(22) PCT Filed: Oct. 28, 2021

(86) PCT No.: PCT/JP2021/039867

§ 371 (c)(1),
(2) Date: May 16, 2023

(87) PCT Pub. No.: WO2022/113638

PCT Pub. Date: Jun. 2, 2022

(65) Prior Publication Data

US 2024/0015460 A1 Jan. 11, 2024

(30) Foreign Application Priority Data

Nov. 25, 2020 (JP) ................................. 2020-195497

(51) Int. Cl.
*H04S 7/00* (2006.01)

(52) U.S. Cl.
CPC .......... *H04S 7/301* (2013.01); *H04S 2420/01* (2013.01)

(58) Field of Classification Search
CPC ............................. H04S 7/301; H04S 2420/01
USPC .......................................................... 381/303
See application file for complete search history.

(56) References Cited

U.S. PATENT DOCUMENTS

2020/0257548 A1 8/2020 Milne et al.
2022/0060841 A1* 2/2022 Tamaki .................. H04S 7/308

FOREIGN PATENT DOCUMENTS

JP 2011-259299 12/2011
WO WO 2020/138257 7/2020
WO WO 2020/195084 10/2020

OTHER PUBLICATIONS

International Search Report and Written Opinion prepared by the Japan Patent Office on Jan. 4, 2022, for International Application No. PCT/JP2021/039867, 3 pgs.

* cited by examiner

*Primary Examiner* — Vivian C Chin
*Assistant Examiner* — Douglas J Suthers
(74) *Attorney, Agent, or Firm* — SHERIDAN ROSS P.C.

(57) ABSTRACT

An information processing device includes: a signal acquisition unit that acquires an audio signal; a storage unit that stores head-related transfer function information corresponding to a user; a determination processing unit that determines whether or not the head-related transfer function information corresponding to the user is stored in another information processing device; a transfer function acquisition unit that acquires the head-related transfer function information corresponding to the user; and a function application unit that applies the head-related transfer function information corresponding to the user to the audio signal.

20 Claims, 20 Drawing Sheets

INFORMATION PROCESSING DEVICE AND INFORMATION PROCESSING METHOD

CROSS REFERENCE TO RELATED APPLICATIONS

This application is a national stage application under 35 U.S.C. 371 and claims the benefit of PCT Application No. PCT/JP2021/039867, having an international filing date of 28 Oct. 2021, which designated the United States, which PCT application claimed the benefit of Japanese Patent Application No. 2020-195497, filed 25 Nov. 2020, the entire disclosures of each of which are incorporated herein by reference.

TECHNICAL FIELD

The present technology relates to an information processing device and an information processing method related to sound reproduction using head-related transfer function information.

BACKGROUND ART

There are known techniques of performing sound reproduction with increased realistic feeling by localizing a sound image at a desired virtual position in a case of reproducing an audio output.

For example, Patent Document 1 below discloses a technique for measuring a transfer function from a speaker of a television receiver to an ear of a user (listener) to provide optimum sound image localization to the user.

CITATION LIST

Patent Document

Patent Document 1: Japanese Patent Application Laid-Open No. 2011-259299

SUMMARY OF THE INVENTION

Problems to be Solved by the Invention

By the way, in an audio signal reproduction device worn on an ear of a user such as a headphone or an earphone, it is known that it is possible to perform optimal sound reproduction more specialized for an individual user by using appropriate head-related transfer function information according to a shape of the ear of the user or the like.

The acquired head-related transfer function information can be used even when audio signal providing devices (or providing units) that generate and transmit audio signals to audio signal reproduction devices (or audio signal reproduction units) are different.

However, in practice, there is a problem that it is forced to perform an operation or processing for acquiring the head-related transfer function information each time the use of a new audio signal providing device is started.

The present technology has been made in view of the above circumstances, and an object of the present technology is to reduce a burden on a user regarding acquisition of head-related transfer function information and a processing load on an information processing device.

Solutions to Problems

An information processing device according to the present technology includes: a signal acquisition unit that acquires an audio signal; a storage unit that stores head-related transfer function information corresponding to a user; a determination processing unit that determines whether or not the head-related transfer function information corresponding to the user is stored in another information processing device; a transfer function acquisition unit that acquires the head-related transfer function information corresponding to the user; and a function application unit that applies the head-related transfer function information corresponding to the user to the audio signal.

As a result, for example, even in a state where the head-related transfer function (HRTF) information corresponding to the user is not stored in a newly purchased information processing device (television receiver, headphone, or the like), the HRTF unique to the user calculated so far can be acquired from another information processing device.

The transfer function acquisition unit in the information processing device described above may acquire the head-related transfer function information corresponding to the user from the storage unit, and acquire the head-related transfer function information corresponding to the user from the another information processing device in a case where the head-related transfer function information corresponding to the user is not stored in the storage unit.

As a result, in a case where the corresponding head-related transfer function information is stored in the storage unit of the information processing device, it is not necessary to issue an acquisition request to another information processing device.

The information processing device described above may include a user interface processing unit that performs user interface processing for obtaining the head-related transfer function information corresponding to the user in a case where the head-related transfer function information corresponding to the user is not stored in the storage unit and cannot be acquired from the another information processing device.

For example, processing of displaying information for downloading an application for calculating the head-related transfer function information to the user terminal or the like is executed.

The user interface processing unit in the information processing device described above may execute processing of selecting whether or not to execute processing for obtaining the head-related transfer function information corresponding to the user as the user interface processing.

As a result, it is possible to express an intention to avoid the processing for obtaining the head-related transfer function information in a case where the user saves time and effort for calculating the head-related transfer function information unique to the user.

The user interface processing unit in the information processing device described above may execute processing of displaying guidance information for causing an application to be installed on a user terminal as the user interface processing.

As a result, the user can install an appropriate application by operating according to the display.

The information processing device described above may include a transmission processing unit that transmits the audio signal to a reproduction device.

Such an information processing device is, for example, a television receiver, a personal computer, a tablet terminal, or the like. In particular, it is suitable for an information processing terminal which is highly likely to be shared by a plurality of persons. Then, the reproduction device is a headphone, an earphone, or the like worn by the user. Headphones include headphones of a type to be worn on the head so as to cover the ears, headphones of a neck hanging type, and the like.

The information processing device described above may include: a detection unit that performs connection detection of the reproduction device; and a user interface processing unit that performs user interface processing of selecting whether or not to apply the head-related transfer function information to the audio signal in a case where the detection unit detects connection of the reproduction device.

As a result, for example, when the headphone is connected to the television receiver, it is possible to perform display for causing the display unit of the television receiver to select whether or not to perform surround reproduction using the head-related transfer function information.

The function application unit in the information processing device described above may be capable of executing first application processing of applying the head-related transfer function information corresponding to the user to the audio signal and second application processing of applying standard head-related transfer function information to the audio signal.

For example, even in a case where the user is busy and does not have time to perform an operation or the like for acquiring the head-related transfer function information, sound output can be performed using the standard head-related transfer function information.

The user interface processing unit in the information processing device described above may be capable of executing user interface processing of selecting which of the first application processing and the second application processing is executed in a case where connection of the reproduction device is detected.

As a result, the user can select whether to experience sound reproduction to which the head-related transfer function information unique to the user is applied or to experience sound reproduction to which the head-related transfer function information common to all users is applied.

The user interface processing unit in the information processing device described above may be capable of executing user interface processing for allowing the user to experience a sound field constructed by the audio signal to which the head-related transfer function information has been applied.

For example, some users do not notice that sound reproduction to which the head-related transfer function information is applied is possible.

The user interface processing unit in the information processing device described above may be capable of executing user interface processing for performing login processing for the user.

When the user performs a login operation according to the login processing, the user can be specified.

The user interface processing unit in the information processing device described above may be capable of executing user interface processing for performing login processing for the user, and user interface processing for allowing the user to experience a sound field constructed by the audio signal generated by the second application processing in a case where the transfer function acquisition unit cannot acquire the head-related transfer function information corresponding to the user specified as a result of the login processing.

The case where the head-related transfer function information corresponding to the user specified by the login processing cannot be acquired is, for example, a case where the user has not experienced the sound output to which the head-related transfer function information specialized for the user himself/herself is applied or the like The storage unit in the information processing device described above may store the head-related transfer function information corresponding to the user and the reproduction device in association with each other.

As a result, it is possible to acquire the head-related transfer function information corresponding to the user specified by the login processing or the like without performing communication processing with another information processing device.

The storage unit in the information processing device described above may store a plurality of combinations of the head-related transfer function information corresponding to the user and the reproduction device.

As a result, even in a case where a plurality of users shares and uses the information processing device, the head-related transfer function information corresponding to each user can be acquired.

The information processing device described above may include a user interface processing unit capable of executing user interface processing for switching between an application state in which the head-related transfer function information is applied to the audio signal and a non-application state in which the head-related transfer function information is not applied to the audio signal.

As a result, for example, the user can switch the application or non-application of the head-related transfer function information according to the contents of the content.

The information processing device described above may include a user interface processing unit capable of executing user interface processing for switching the head-related transfer function information corresponding to the user to the head-related transfer function information corresponding to another user.

As a result, in a case where a plurality of users uses the information processing device, the optimal head-related transfer function information can be applied to each user.

The information processing device described above may be a television receiver including a display unit capable of video display.

As a result, when a user whose head-related transfer function information is not stored in the television receiver uses the television receiver, the television receiver executes processing of acquiring the head-related transfer function information corresponding to the user from another information processing device such as the server device.

The information processing device described above may include a user interface processing unit capable of executing: user interface processing for performing login processing for a user; and user interface processing for displaying, on the display unit, information for causing an application for calculating the head-related transfer function information corresponding to the user to be installed on a user terminal in a case where the head-related transfer function information corresponding to the user specified as a result of the login processing is not stored in the storage unit and cannot be acquired from another information processing device, in which the transfer function acquisition unit acquires the head-related transfer function information corresponding to the user calculated on the basis of information transmitted from the user terminal from the another information processing device.

The user who uses the television receiver can be specified by the login processing. Furthermore, as a result, the head-related transfer function information corresponding to the specified user can be acquired from the storage unit or another information processing device. Furthermore, in a case where the head-related transfer function information corresponding to the specified user cannot be acquired, for example, the user is guided to use a camera application for acquiring the shape of the ear of the user so that the head-related transfer function information corresponding to the user can be calculated.

An information processing method executed by an information processing device according to the present technology includes: acquiring an audio signal; storing head-related transfer function information corresponding to a user; determining whether or not the head-related transfer function information corresponding to the user is stored in another information processing device; acquiring the head-related transfer function information corresponding to the user; and applying the head-related transfer function information corresponding to the user to the audio signal.

According to such an information processing method, it is also possible to obtain an action similar to that of the information processing device according to the present technology described above.

MODE FOR CARRYING OUT THE INVENTION

Figure 1:
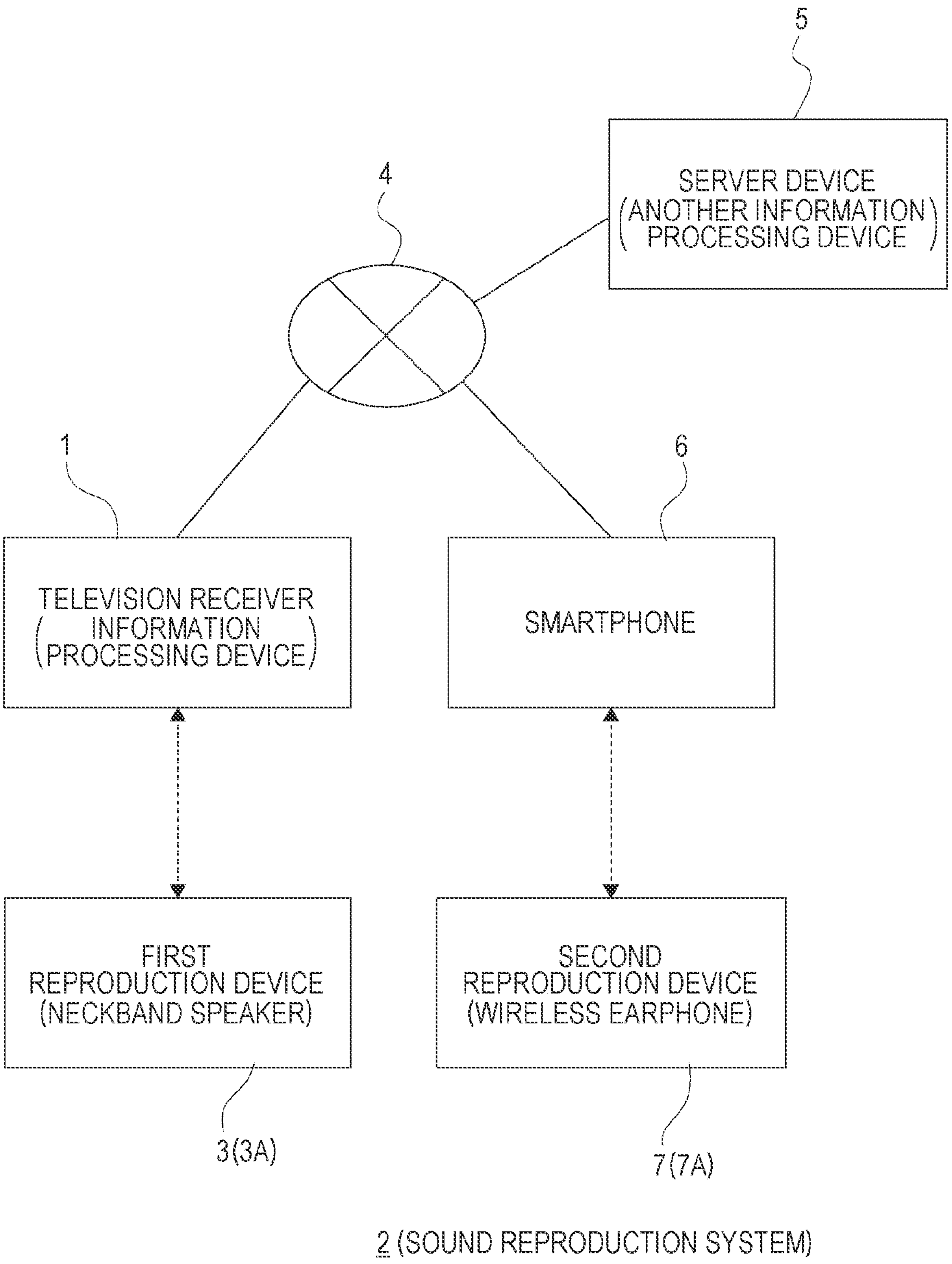
FIG. 1 is a diagram illustrating a configuration example of a sound reproduction system according to the present technology.

Hereinafter, embodiments according to the present technology will be described in the following order with reference to the accompanying drawings.

<1. System Configuration>
<2. Functional Configuration of Computer Device>
<3. Configuration of Television Receiver>
<4. Configuration of Neckband Speaker>
<5. UI Processing>
<6. Flowchart>
<6-1. Initial Setting Flow>
<6-2. Flow of Acquiring Head-Related Transfer Function Information HRTF>
<6-3. Flow of Applying Head-Related Transfer Function Information HRTF>
<7. Modifications>
<8. Summary>
<9. Present Technology>

1. System Configuration

A configuration of a sound reproduction system 2 including a television receiver 1 as an information processing device of the present technology will be described with reference to FIG. 1.

The sound reproduction system 2 includes a television receiver 1, a first reproduction device 3, a communication network 4, a server device 5, a smartphone 6, and a second reproduction device 7.

Note that the configuration illustrated in FIG. 1 is an example, and the sound reproduction system 2 may include only the television receiver 1, the first reproduction device 3, the communication network 4, and the server device 5, may include an information processing device other than the television receiver 1 or the smartphone 6, or may include an audio signal reproduction device (such as a headphone or an earphone) other than the first reproduction device 3 or the second reproduction device 7.

The television receiver 1 is an example of an information processing device in the present embodiment, and is an information processing device that performs processing of transmitting an audio signal generated by applying (convolving) the head-related transfer function information HRTF to the audio signal to an audio signal reproduction device.

The first reproduction device 3 is a device that reproduces an audio signal, and is, for example, an earphone, a headphone, or a neckband speaker. In the following example, a neckband speaker 3A as the first reproduction device 3 will be described as an example.

The neckband speaker 3A receives an audio signal to which the head-related transfer function information HRTF is applied from the television receiver 1 and reproduces the audio signal to perform sound output. In the following description, the audio signal before the application of the head-related transfer function information HRTF is described as "pre-correction audio signal SA", and the audio signal after the application of the head-related transfer function information HRTF is described as "post-correction audio signal SB".

Note that the audio signal reproduction device may have both a function as the information processing device and a function as the first reproduction device 3. For example, an earphone or a headphone as an audio signal reproduction device may include a generation unit that outputs an audio signal generated by applying (convolving) the head-related transfer function information HRTF, and a reproduction unit that receives the generated audio signal reproduction device and performs a reproduction process.

The communication network 4 is not particularly limited, and other than the Internet, for example, an intranet, an extra network, a local area network (LAN), a community antenna television (CATV) communication network, a virtual private network, a telephone network, a mobile communication network, a satellite communication network, or the like is assumed.

Furthermore, various examples are also assumed for transmission media constituting all or a part of the communication network 4. For example, the present technology can be used in a wired manner such as Institute of Electrical and Electronics Engineers (IEEE) 1394, a universal serial bus (USB), power line conveyance, or a telephone line, or in a wireless manner such as infrared rays such as infrared data association (IrDA), Bluetooth (registered trademark), 802.11 radio, a mobile phone network, a satellite line, or a terrestrial digital network.

The server device 5 is another information processing device different from the television receiver 1, and is a device that provides various functions and information. Specifically, a function of storing and managing the head-related transfer function information HRTF for each user, a function related to login, and the like can be provided.

Further, the server device 5 can execute a process of acquiring the head-related transfer function information HRTF corresponding to the user specified by the login processing from the database and transmitting the head-related transfer function information HRTF to the television receiver 1 or the smartphone 6.

Note that the head-related transfer function information HRTF managed by the server device 5 may be the head-related transfer function itself or a coefficient used for the head-related transfer function. These are collectively referred to as head-related transfer function information HRTF.

Similarly to the television receiver 1, the smartphone 6 is an information processing device that performs processing of transmitting the post-correction audio signal SB generated by applying the head-related transfer function information HRTF to the pre-correction audio signal SA to the second reproduction device 7 as an audio signal reproduction device.

Furthermore, in the following description, the smartphone 6 is an example of a user terminal to be described later used by the user. That is, the smartphone 6 is a terminal that transmits the post-correction audio signal SB to the second reproduction device 7, and is also a user terminal operated by the user in order to implement various processes described later.

Of course, a device such as a personal computer (PC) or a tablet other than the smartphone 6 may be used as the user terminal.

The second reproduction device 7 is a device that reproduces an audio signal, and is, for example, an earphone, a headphone, or a neckband speaker. In the following example, a wireless earphone 7A as the second reproduction device 7 will be described as an example.

The wireless earphone 7A receives post-correction audio signal SB from smartphone 6, and reproduces post-correction audio signal SB to perform sound output.

Note that, in the following description, a case where the user A who has experienced sound reproduction to which the head-related transfer function information HRTF corresponding to the user A is applied using the smartphone 6 and the wireless earphone 7A newly starts using the television receiver 1 and the neckband speaker 3A will be described as an example.

That is, the server device 5 stores images of both ears of the user A captured using the smartphone 6 and information of the head-related transfer function information HRTF calculated from the images in association with user information such as a user identification (ID) for specifying the user A.

Note that the user information and the head-related transfer function information HRTF may be stored in the server device 5, and the ear image may not be stored in the server device 5.

In the following description, the user A will be simply referred to as a "user".

2. Functional Configuration of Computer Device

A functional configuration of a computer device as the television receiver 1, the server device 5, or the smartphone 6 will be described with reference to FIG. 2.

Figure 2:
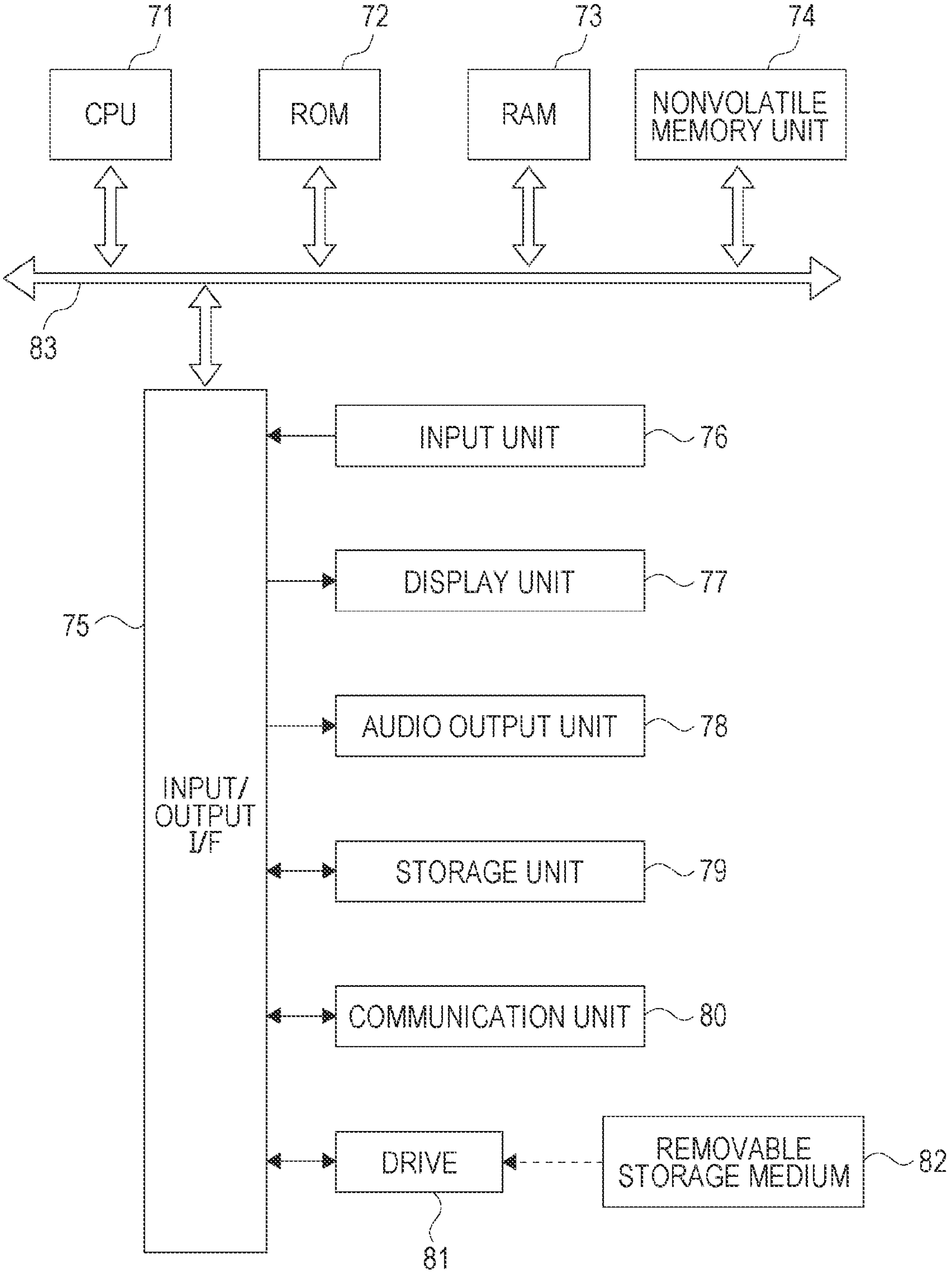
FIG. 2 is a diagram illustrating a functional configuration example of a computer device.

As illustrated in FIG. 2, a CPU 71 of the computer device executes various types of processing according to a program stored in a nonvolatile memory unit 74 such as a ROM 72 or an electrically erasable programmable read-only memory (EEP-ROM), for example, or a program loaded from a storage unit 79 to a RAM 73. The RAM 73 also appropriately stores data and the like necessary for the CPU 71 to execute various processes.

The CPU 71, the ROM 72, the RAM 73, and the nonvolatile memory unit 74 are connected to one another via a bus 83. An input/output interface 75 is also connected to the bus 83.

An input unit 76 including an operator and an operation device is connected to the input/output interface 75.

For example, as the input unit 76, various operators and operation devices such as a keyboard, a mouse, a key, a dial, a touch panel, a touch pad, a remote controller, and the like are assumed.

An operation of the user is detected by the input unit 76, and a signal corresponding to the input operation is interpreted by the CPU 71.

In addition, a display unit 77 including an LCD, an organic EL panel, or the like, and an audio output unit 78 including a speaker or the like are connected to the input/output interface 75 integrally or separately.

The display unit 77 is a display unit that performs various displays, and includes, for example, a display device provided in a housing of a computer device, a separate display device connected to the computer device, or the like.

The display unit 77 executes display of an image for various types of image processing, a moving image to be processed, and the like on a display screen on the basis of an instruction from the CPU 71. In addition, the display unit 77 displays various operation menus, icons, messages, and the like, that is, displays as a graphical user interface (GUI) on the basis of an instruction from the CPU 71.

In some cases, a storage unit 79 including a hard disk, a solid-state memory, or the like, and a communication unit 80 including a modem or the like are connected to the input/output interface 75.

The communication unit 80 performs communication processing via a transmission path such as the Internet, wired/wireless communication with various devices, bus communication, and the like.

A drive 81 is also connected to the input/output interface 75 as necessary, and a removable storage medium 82 such as a magnetic disk, an optical disk, a magneto-optical disk, or a semiconductor memory is appropriately mounted.

A data file such as an image file, various computer programs, and the like can be read from the removable storage medium 82 by the drive 81. The read data file is stored in the storage unit 79, and images and sounds included in the data file are output by the display unit 77 and the audio output unit 78. Furthermore, a computer program and the like read from the removable storage medium 82 are installed in the storage unit 79 as necessary.

In this computer device, for example, software for processing of the present embodiment can be installed via network communication by the communication unit 80 or the removable storage medium 82. Alternatively, the software may be stored in advance in the ROM 72, the storage unit 79, or the like.

The CPU 71 performs processing operations on the basis of various programs, thereby executing information processing and communication processing necessary for the television receiver 1, the server device 5, and the smartphone 6.

Note that the information processing device constituting the television receiver 1, the server device 5, or the smartphone 6 is not limited to the single computer device illustrated in FIG. 2, and may be configured by systematizing a plurality of computer devices. The plurality of computer devices may be systematized by a LAN or the like, or may be arranged in a remote place by a VPN or the like using the Internet or the like. The plurality of information processing devices may include an information processing device as a server group (cloud) usable by a cloud computing service.

Furthermore, the neckband speaker 3A as the first reproduction device 3 and the wireless earphone 7A as the second reproduction device 7 may include functional blocks as a computer device as illustrated in FIG. 2.

Note that the neckband speaker 3A and the wireless earphone 7A do not need to include all the functional configurations illustrated in FIG. 2, and may include only a part thereof. It similarly applies to the television receiver 1, the server device 5, and the smartphone 6.

3. Configuration of Television Receiver

Figure 3:
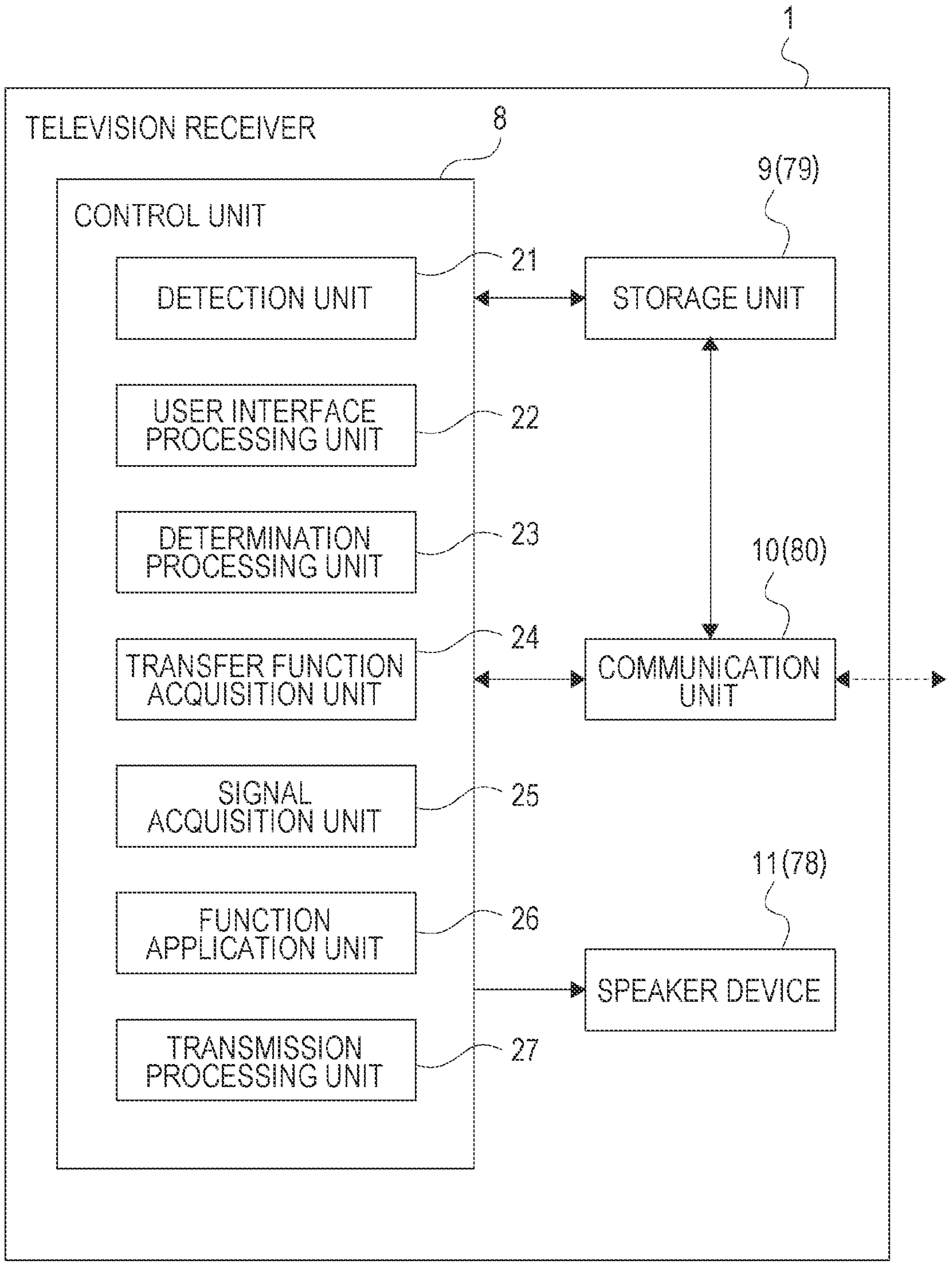
FIG. 3 is a diagram illustrating a configuration example of a television receiver.

A configuration example of the television receiver 1 will be described with reference to FIG. 3.

The television receiver 1 includes a control unit 8 (CPU 71), a storage unit 9 (storage unit 79), a communication unit 10 (communication unit 80), and a speaker device 11 (audio output unit 78).

The control unit 8 has various functions by the CPU 71 of the television receiver 1 as a computer device as illustrated in FIG. 2 operating on the basis of programs.

Specifically, the control unit 8 functions as a detection unit 21, a user interface processing unit 22, a determination processing unit 23, a transfer function acquisition unit 24, a signal acquisition unit 25, a function application unit 26, and a transmission processing unit 27.

The detection unit 21 performs processing of detecting that an audio signal reproduction device such as the neckband speaker 3A is connected to the television receiver 1.

Specifically, connection detection is performed on the basis of near field communication, wired communication, or the like performed by the communication unit 10.

Alternatively, the detection unit 21 may detect that the neckband speaker 3A approaches the television receiver 1.

The user interface processing unit 22 performs various types of user interface processing for generating the post-correction audio signal SB to which the head-related transfer function information HRTF is applied. In the following description, a user interface will be referred to as a user interface (UI).

The UI processing unit 22 can execute processing for the user to log in. In order for the user to enjoy the optimum sound output for the user himself/herself using the neckband speaker 3A, it is important what type of head-related transfer function information HRTF is applied to the pre-correction audio signal SA to generate the post-correction audio signal SB.

The UI processing unit 22 obtains information for acquiring the head-related transfer function information HRTF corresponding to the user by specifying the user through the login operation of the user.

The UI processing for login may be, for example, processing of presenting an interface for inputting a user ID and a password, or processing of displaying information (for example, two-dimensional code information) for displaying a web page or the like for performing login operation on a user terminal such as a smartphone used by the user.

Furthermore, the UI processing unit 22 can execute UI processing of selecting whether or not to perform correction using the head-related transfer function information HRTF on the pre-correction audio signal SA, and UI processing of selecting what type of head-related transfer function information HRTF is applied.

The user can select not to perform correction using the head-related transfer function information HRTF via the UI provided by the UI processing unit 22. Furthermore, in a case where not only the head-related transfer function information HRTF corresponding to the specified user but also the standard head-related transfer function information HRTF effective for many users are stored in the storage unit 9 as the head-related transfer function information HRTF, the UI processing unit 22 may be capable of executing UI processing capable of selecting which one of the head-related transfer function information HRTF corresponding to the user and the standard head-related transfer function information HRTF is applied. This UI processing may be executed in response to detection of connection of the neckband speaker 3A or the like by the detection unit 21.

Furthermore, in a case where the head-related transfer function information HRTF corresponding to the user is not stored in the storage unit 9 and cannot be acquired from the server device 5, UI processing for executing processing for calculating the head-related transfer function information HRTF corresponding to the user can be executed.

Specifically, it is possible to execute processing indicating a procedure for calculating the head-related transfer function information HRTF corresponding to the user, processing for selecting whether or not to perform an operation for obtaining the head-related transfer function information HRTF corresponding to the user according to the procedure, and the like. Furthermore, a process of displaying a two-dimensional code for installing an application for imaging the user's ear or the like may be executable.

Note that there are users who have never experienced sound output to which the head-related transfer function information HRTF is applied. For such a user, the UI processing unit 22 may be capable of executing UI processing for demonstration experience. For example, the UI processing unit 22 executes processing of displaying a demonstration screen for experiencing sound output to which the standard head-related transfer function information HRTF is applied, processing of presenting guidance for actually acquiring the head-related transfer function information HRTF corresponding to the user after finishing the demonstration experience, and the like.

The UI processing for such a demonstration experience may be executable in response to the detection unit 21 detecting the connection to the neckband speaker 3A or the like. That is, the processing may be implemented by cooperation of the detection unit 21 and the UI processing unit 22.

Note that such a demonstration experience may be executed, for example, in a case where the head-related transfer function information HRTF corresponding to the user specified by the login processing cannot be acquired.

Further, depending on the content projected on the television receiver 1, it may be preferable to reproduce the pre-correction audio signal SA instead of the post-correction audio signal SB to which the head-related transfer function information HRTF is applied.

In order to cope with such content, the UI processing unit 22 may perform UI processing for switching between a state of performing sound output based on the post-correction audio signal SB to which the head-related transfer function information HRTF is applied and a state of performing sound output using the pre-correction audio signal SA. Furthermore, the UI processing unit 22 may perform UI processing for selecting whether or not to apply the head-related transfer function information HRTF. As a result, the user can appropriately select whether or not to perform correction to which the head-related transfer function information HRTF is applied.

The television receiver 1 is used not only by one person but also by a plurality of persons such as family members. Accordingly, in a case where the audio signal reproduction device such as the neckband speaker 3A is connected to the television receiver 1, the UI processing unit 22 may be capable of executing UI processing of selecting which head-related transfer function information HRTF is used among the head-related transfer function information HRTF of the plurality of users stored in the storage unit 9, or UI processing of selecting whether or not to apply the head-related transfer function information HRTF in the first place.

Such processing can be implemented, for example, by cooperation of the detection unit 21 and the UI processing unit 22.

Furthermore, notification processing for notifying the user that the correction using the head-related transfer function information HRTF corresponding to which user is performed may be executable. According to the notification processing of the UI processing unit 22, the user can perform an operation of selecting the head-related transfer function information HRTF or the like so as to generate the post-correction audio signal SB using the head-related transfer function information HRTF corresponding to the user.

The UI processing for such notification may be, for example, notification processing by sound, notification processing of displaying character information on a screen, or notification processing of performing notification using a user terminal used by the user.

In addition, the UI processing unit 22 may be capable of executing UI processing for newly registering a user, UI processing for registering the first reproduction device 3, UI processing for associating the registered user with the first reproduction device 3, and the like.

Furthermore, the UI processing unit 22 may be capable of executing UI processing or the like for associating the user terminal used by the user with the television receiver 1.

Furthermore, the UI processing unit 22 may be capable of executing UI processing of displaying a user list registered in the television receiver 1. The user displayed in the user list includes users in which the information of the head-related transfer function information HRTF is stored in the storage unit 9, users in which the information of the head-related transfer function information HRTF is stored in the server device 5 but is not stored in the storage unit 9 of the television receiver 1, users in which the head-related transfer function information HRTF is not calculated in the first place, unregistered users (for example, users treated as guests) who are not registered, and the like.

The determination processing unit 23 performs processing of determining whether or not the head-related transfer function information HRTF corresponding to the user is stored in the storage unit 9. Furthermore, the determination processing unit 23 performs processing of determining whether or not the head-related transfer function information HRTF corresponding to the user is stored in the server device 5 as another information processing device.

A notification of a determination result as to whether or not the head-related transfer function information HRTF corresponding to the user is stored in the storage unit 9 is provided to the transfer function acquisition unit 24.

Note that the determination processing unit 23 can specify the user to be subjected to the determination processing by various methods.

For example, the above-described determination processing may be performed on the user selected by the user on the UI screen provided by the UI processing unit 22. As a result, determination processing as to whether or not the head-related transfer function information HRTF corresponding to the selected user is stored in the storage unit 9 is executed.

Alternatively, in a case where the detection unit 21 detects the connection of the neckband speaker 3A, the above determination processing may be performed on the user who has used the neckband speaker 3A last.

In addition, in a case where the television receiver 1 has a camera function, a user who intends to use the television receiver 1 may be specified by performing image processing using an image captured using the camera function, and the above determination processing may be performed on the user.

Furthermore, information for specifying the user may be received from the neckband speaker 3A connected to the television receiver 1, and the above determination processing may be performed on the user.

In addition, information in which an audio signal reproduction device and a user who uses the audio signal reproduction device are associated with each other may be stored in the storage unit 9, the associated user may be specified by specifying the audio signal reproduction device detected by the detection unit 21, and the above determination processing may be performed.

The transfer function acquisition unit 24 acquires the head-related transfer function information HRTF corresponding to the user on the basis of the determination result of the determination processing unit 23.

Specifically, in a case where the head-related transfer function information HRTF corresponding to the user is stored in the storage unit 9, the transfer function acquisition unit 24 acquires the head-related transfer function information HRTF from the storage unit 9. On the other hand, in a case where the head-related transfer function information HRTF corresponding to the user is not stored in the storage unit 9, the transfer function acquisition unit 24 acquires the head-related transfer function information HRTF corresponding to the user from the server device 5 by transmitting information for specifying the user to the server device 5 as another information processing device. Note that, in a case where the determination processing unit 23 determines that the head-related transfer function information HRTF corresponding to the user is not stored in either the storage unit 9 or the server device 5, the transfer function acquisition unit 24 does not acquire the head-related transfer function information HRTF corresponding to the user.

Note that the transfer function acquisition unit 24 may have a function of determination processing of the determination processing unit 23. For example, instead of the determination processing unit 23 determining whether or not the head-related transfer function information HRTF is stored in the storage unit 9, the transfer function acquisition unit 24 may attempt to acquire the head-related transfer function information HRTF from the storage unit 9 and determine that the head-related transfer function information HRTF is not stored in the storage unit 9 in a case where the head-related transfer function information HRTF cannot be acquired. Then, the transfer function acquisition unit 24 is only required to acquire the head-related transfer function information HRTF from the server device 5 in a case where the head-related transfer function information HRTF cannot be acquired from the storage unit 9. Further, in a case where the transfer function acquisition unit 24 cannot acquire the head-related transfer function information HRTF from the server device 5, it may be determined that the server device 5 does not store the head-related transfer function information HRTF.

In a case where the head-related transfer function information HRTF corresponding to the user cannot be acquired from either the storage unit 9 or the server device 5, the transfer function acquisition unit 24 notifies the UI processing unit 22 of the fact. In response to this notification, the UI processing unit 22 executes UI processing for newly calculating the head-related transfer function information HRTF corresponding to the user.

The signal acquisition unit 25 acquires the pre-correction audio signal SA from the RAM 73, the removable storage medium 82, the communication unit 10, or the like, and passes the pre-correction audio signal SA to the speaker device 11, the communication unit 10, or the function application unit 26.

That is, in a case where sound output is performed from the television receiver 1 without applying the head-related transfer function information HRTF, the acquired pre-correction audio signal SA is transmitted to the speaker device 11.

Furthermore, in a case where sound output is performed from the neckband speaker 3A without applying the head-related transfer function information HRTF, the pre-correction audio signal SA is transmitted to the neckband speaker 3A via the communication unit 10.

On the other hand, in a case where the head-related transfer function information HRTF is applied, the acquired pre-correction audio signal SA is transmitted to the function application unit 26.

The function application unit 26 performs processing of generating the post-correction audio signal SB by applying the head-related transfer function information HRTF to the pre-correction audio signal SA. The head-related transfer function information HRTF to be applied may correspond to the user as a listener or may be standard.

In the following description, processing of applying the head-related transfer function information HRTF corresponding to the user will be referred to as "first application processing", and processing of applying the standard head-related transfer function information HRTF will be referred to as "second application processing".

As described above, the transmission processing unit 27 performs processing of transmitting the pre-correction audio signal SA, the post-correction audio signal SB to which the head-related transfer function information HRTF corresponding to the user is applied, the post-correction audio signal SB to which the standard head-related transfer function information HRTF is applied, and the like to the neckband speaker 3A. For this purpose, the transmission processing unit 27 controls the communication unit 10.

That is, the transmission processing unit 27 can transmit the post-correction audio signal SB and the like to which the head-related transfer function information HRTF corresponding to the user specified by the determination processing unit 23 is applied to the neckband speaker 3A.

The storage unit 9 functions as the storage unit 79 in the television receiver 1 as a computer device. The storage unit 9 stores the head-related transfer function information HRTF corresponding to the user used for the first application processing, the standard head-related transfer function information HRTF, and the like.

Furthermore, the storage unit 9 may store user information and the like. Furthermore, in that case, the user information that can be specified by the user and the head-related transfer function information HRTF may be stored in association with each other so that the corresponding head-related transfer function information HRTF can be specified for each user.

Furthermore, in addition to the user and the head-related transfer function information HRTF, information of an audio signal reproduction device such as the neckband speaker 3A may be stored in association with each other.

As such information, a plurality of pieces of data may be stored according to a plurality of users, or one piece of data according to one user who uses the television receiver 1 may be stored.

The communication unit 10 functions as the communication unit 80 in the television receiver 1 as a computer device.

The communication unit 10 can execute transmission processing and reception processing in various communication modes.

For example, the communication unit 10 may be capable of directly transmitting the pre-correction audio signal SA and the post-correction audio signal SB to the neckband speaker 3A by using wired communication or wireless communication (Bluetooth or the like).

Furthermore, the communication unit 10 may be capable of transmitting the pre-correction audio signal SA and the post-correction audio signal SB to the neckband speaker 3A via the relay device HU connected by a wired optical cable.

Communication between the relay device HU and the neckband speaker 3A may be wireless communication or wired communication.

Note that the relay device HU may be paired with the neckband speaker 3A to enable wireless communication with the neckband speaker 3A.

Furthermore, the communication unit 10 may be capable of transmitting the compressed pre-correction audio signal SA and post-correction audio signal SB to the neckband speaker 3A.

Note that the head-related transfer function information HRTF is applied to the post-correction audio signal SB transmitted by the communication unit 10 in the television receiver 1. That is, information for 2ch processed in accordance with the number of output channels of the neckband speaker 3A is transmitted from the communication unit 10. As a result, the communication amount is reduced as compared with the case where multichannel audio signals of 3ch or more are transmitted from the communication unit 10 to the neckband speaker 3A, which is suitable for wireless communication.

In addition, since it is not necessary to perform the processing of applying the head-related transfer function information HRTF in the neckband speaker 3A, the neckband speaker 3A may not include a high-performance arithmetic processing unit. Therefore, it is possible to suppress an increase in size, an increase in cost, and the like of the neckband speaker 3A. In addition, it is possible to suppress a failure caused by heat generated by mounting the high-performance arithmetic processing unit on the neckband speaker 3A and discomfort at the time of wearing.

The speaker device 11 functions as the audio output unit 78 in the television receiver 1 as a computer device.

The speaker device 11 functions as an audio signal reproduction unit in a case where the audio signal is output from the television receiver 1 without being transmitted to the neckband speaker 3A.

4. Configuration of Neckband Speaker

Figure 4:
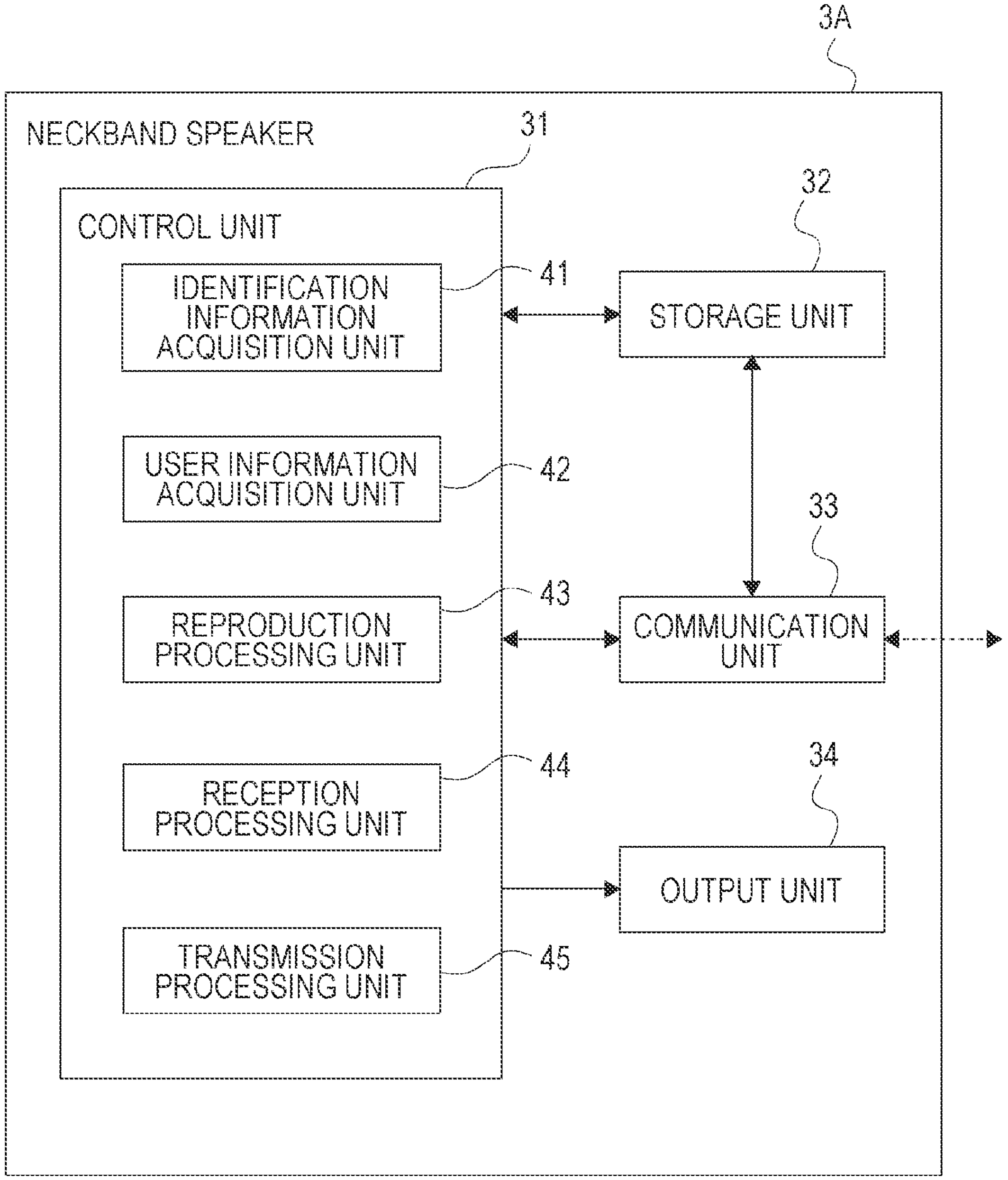
FIG. 4 is a diagram illustrating a configuration example of a neckband speaker.

A configuration example of the neckband speaker 3A will be described with reference to FIG. 4. Note that the neckband speaker 3A does not need to have all the configurations illustrated in FIG. 4.

The neckband speaker 3A includes a control unit 31, a storage unit 32, a communication unit 33, and an output unit 34.

The control unit 31 is capable of executing various types of processing such as processing necessary for reproducing an audio signal, and is configured by the CPU 71 and the like in the computer device.

The storage unit 32 stores various types of information, and functions as the storage unit 79 in the neckband speaker 3A as a computer device. The stored information is, for example, information for specifying the neckband speaker 3A such as a serial number, model number information, manufacturer information, or the like, information for specifying a listener such as a user ID, or the like. Furthermore, the storage unit 32 may be used as a buffer memory or a cache memory of an audio signal received from the television receiver 1.

The user information stored in the storage unit 32 may be for one person or for a plurality of persons.

The output unit 34 outputs an audio signal on the basis of the control of the control unit 31. The output unit 34 functions as the audio output unit 78 in the neckband speaker 3A as a computer device.

The control unit 31 functions as, for example, an identification information acquisition unit 41, a user information acquisition unit 42, a reproduction processing unit 43, a reception processing unit 44, and a transmission processing unit 45.

The identification information acquisition unit 41 performs processing of acquiring, from the storage unit 32, identification information or the like that can specify the neckband speaker 3A.

The user information acquisition unit 42 performs processing of acquiring, from the storage unit 32, information or the like that can specify the user who is using the neckband speaker 3A.

The reproduction processing unit 43 receives the encoded audio signal from the communication unit 33, decodes the audio signal, and outputs the decoded audio signal to the output unit 34, thereby reproducing the audio signal.

The reception processing unit 44 performs processing of receiving the compressed data of the pre-correction audio signal SA and the post-correction audio signal SB from the television receiver 1. In addition, the received data is stored in the storage unit 32 as necessary.

The transmission processing unit 45 performs processing of transmitting the above-described various types of information and the like stored in the storage unit 32 to another device such as the television receiver 1.

In addition to the above, the control unit 31 can execute UI processing for registering user information, various notification processing, and the like. Further, the control unit 31 can also execute processing or the like related to pairing between the neckband speaker 3A and the television receiver 1.

5. UI Processing

A screen displayed on a display unit D of the television receiver 1 by processing executed by the UI processing unit 22 of the television receiver 1, a screen displayed on a display unit Ds of the smartphone 6 operated by the user, and the like will be described.

Figure 5:
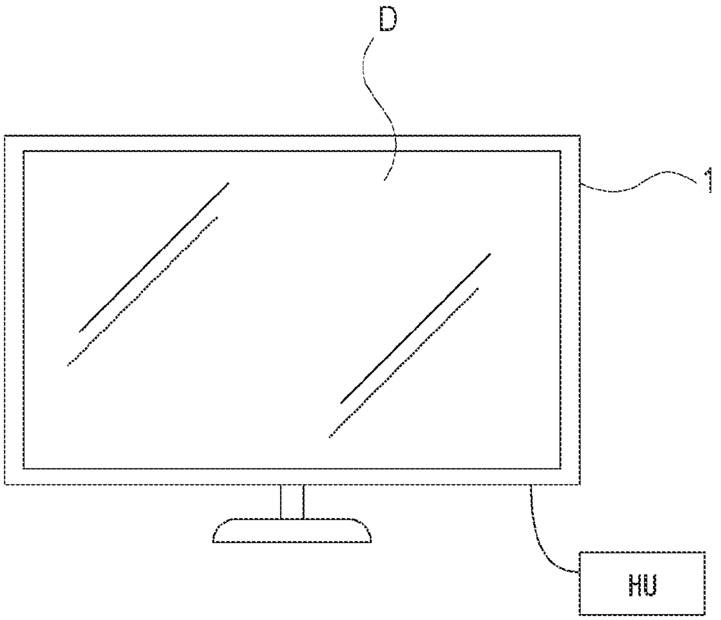
FIG. 5 is a diagram illustrating a connection state between a television receiver and a relay device.
Figure 6:
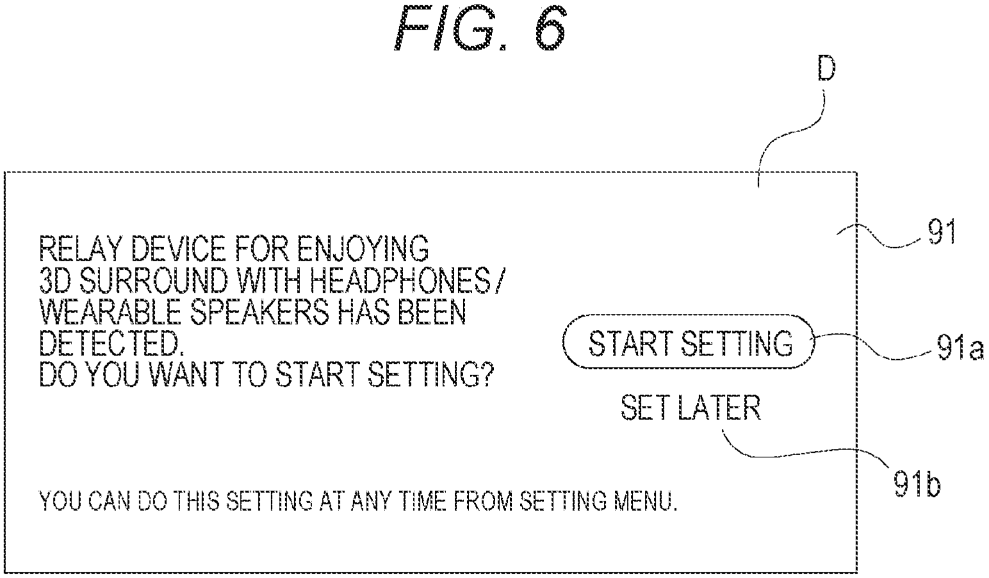
FIG. 6 is a view illustrating an example of a setting start screen.

First, when the relay device HU is connected to the television receiver 1 by a wired optical cable as illustrated in FIG. 5, a setting start screen 91 as illustrated in FIG. 6 is displayed on the display unit D of the television receiver 1. As a result, it is possible to start initial setting processing for performing sound output from the television receiver 1 from the neckband speaker 3A.

On the setting start screen 91, a start button 91*a* for starting the setting and a suspend button 91*b* for suspending the setting without immediately starting the setting are arranged.

When the suspend button 91*b* is selected, each screen described below is not displayed, and the initial setting processing ends.

Figure 7:
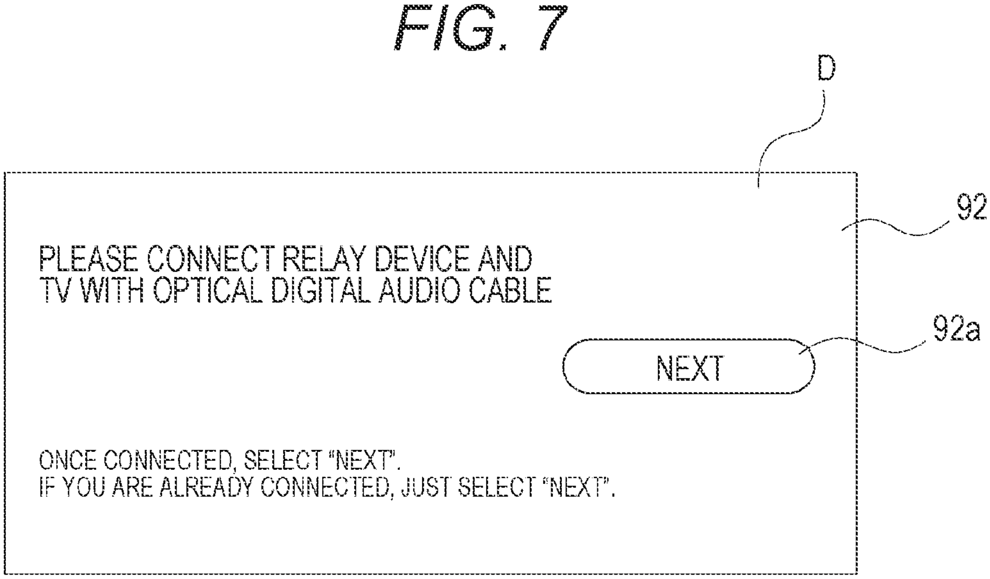
FIG. 7 is a view illustrating an example of a connection instruction screen.

When the start button 91*a* is selected, a connection instruction screen 92 as illustrated in FIG. 7 is displayed on the display unit D of the television receiver 1.

The connection instruction screen 92 is a screen for prompting the user to connect the relay device HU to the television receiver 1. A next button 92*a* is arranged on the connection instruction screen 92.

The user who has connected the relay device HU or the user who has already connected the relay device HU can proceed with the initial setting processing by selecting the next button 92*a*.

Figure 8:
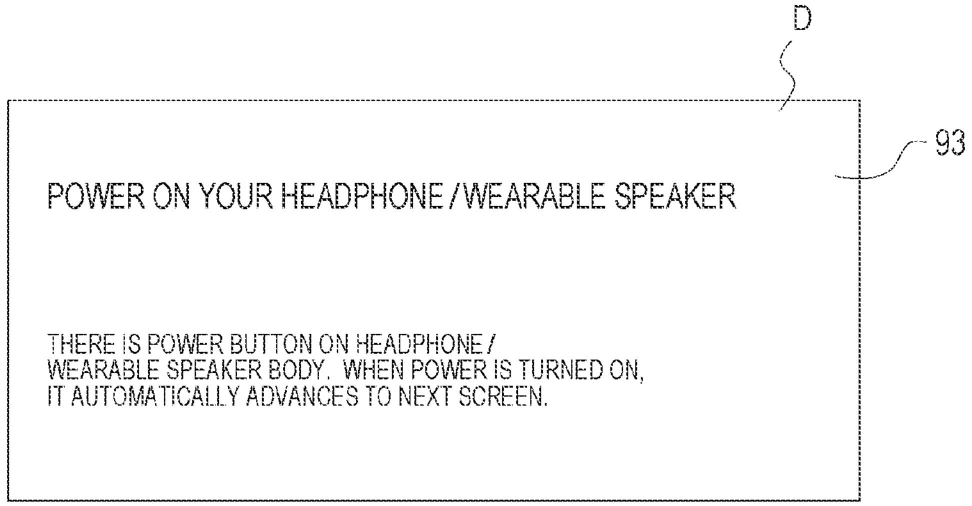
FIG. 8 is a diagram illustrating an example of a reproduction device connection instruction screen.

After the next button 92*a* is selected in a state where the relay device HU is connected to the television receiver 1, a reproduction device connection instruction screen 93 as illustrated in FIG. 8 is displayed on the display unit D of the television receiver 1.

The reproduction device connection instruction screen 93 is a screen for instructing pairing between the neckband speaker 3A as the audio signal reproduction device and the relay device HU. The pairing between the neckband speaker 3A and the relay device HU is automatically performed, for example, by turning on the power of the neckband speaker 3A.

Figure 9:
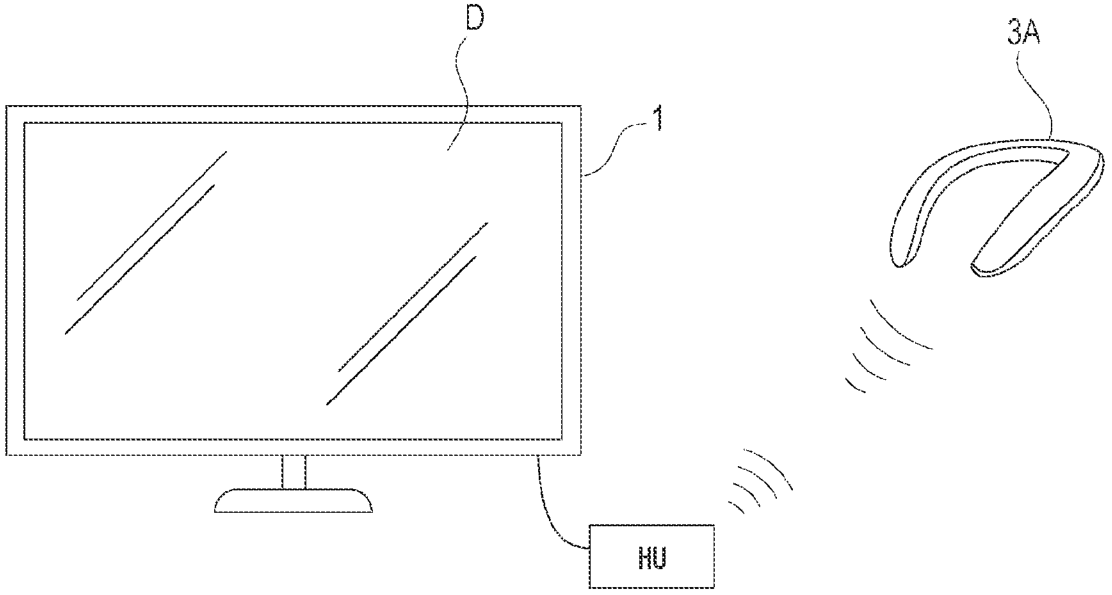
FIG. 9 is a diagram illustrating a state in which the neckband speaker and the relay device are paired.
Figure 10:
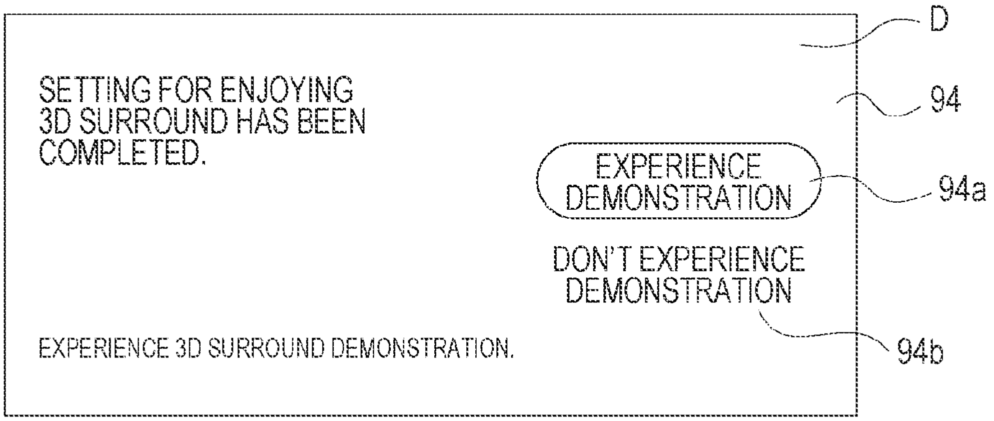
FIG. 10 is a diagram illustrating an example of an initial setting completion notification screen.

When the user pairs the neckband speaker 3A and the relay device HU according to the instruction of the display unit D (see FIG. 9), an initial setting completion notification screen 94 as illustrated in FIG. 10 is automatically displayed on the display unit D of the television receiver 1.

On the initial setting completion notification screen 94, options such as a button for selecting whether or not to experience 3D surround reproduction to which the head-related transfer function information HRTF is applied are arranged.

In the example illustrated in FIG. 10, a demonstration experience button 94*a* and a demonstration non-experience button 94*b* are arranged on the initial setting completion notification screen 94.

In a case where the demonstration non-experience button 94*b* is selected, each screen described below is not displayed. Alternatively, in this case, a screen prompting the user to log in or a screen prompting the user to select the head-related transfer function information HRTF may be displayed.

In a case where the demonstration experience button 94*a* is selected, a demonstration experience video is displayed on the display unit D of the television receiver 1, and sound output is performed from the neckband speaker 3A. The sound output at this time is based on the post-correction audio signal SB obtained by applying the standard head-related transfer function information HRTF to the pre-correction audio signal SA.

Figure 11:
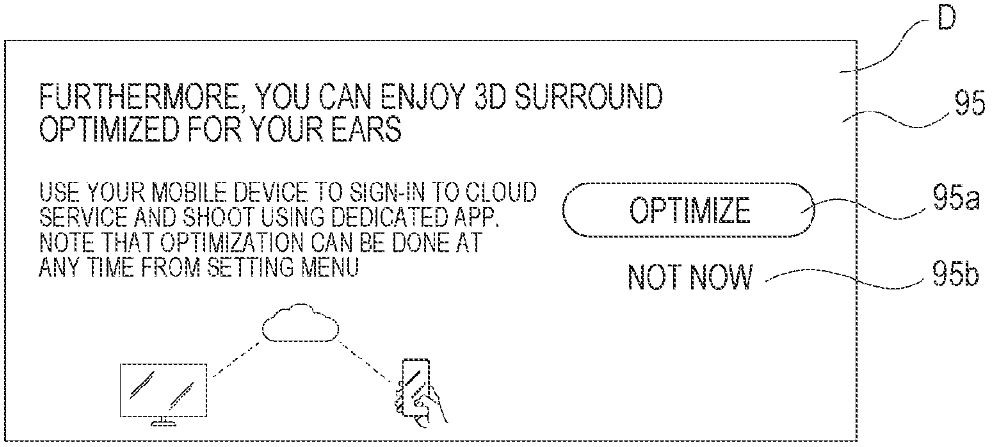
FIG. 11 is a diagram illustrating an example of an optimization selection screen.

After the display of the demonstration experience video, an optimization selection screen 95 as illustrated in FIG. 11 is displayed on the display unit D of the television receiver 1.

An optimization execution button 95*a* and an optimization non-execution button 95*b* are arranged on the optimization selection screen 95.

The optimization execution button 95*a* is an option selected in a case where an optimum setting specialized for the user who uses the neckband speaker 3A newly connected this time is performed. The optimization non-execution button 95*b* is an option selected in a case where such personal optimization is not performed.

Figure 12:
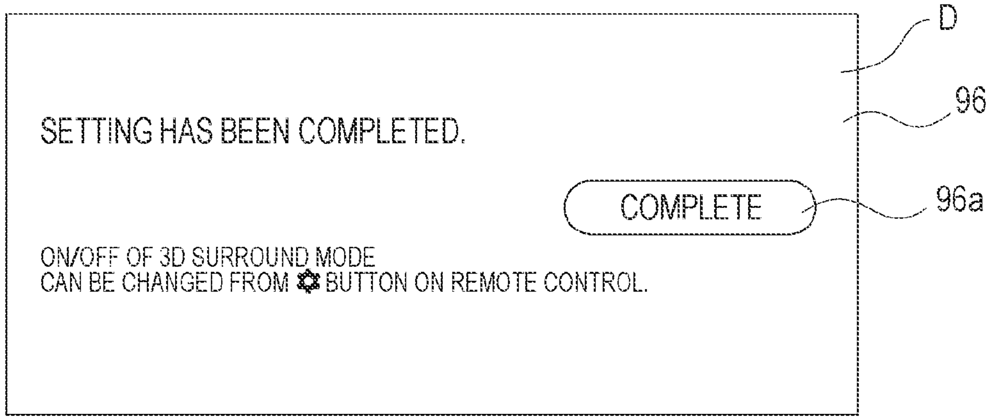
FIG. 12 is a view illustrating an example of a setting completion screen.

In a case where the optimization non-execution button 95*b* is selected, a setting completion screen 96 as illustrated in FIG. 12 is displayed. A completion button 96*a* is arranged on the setting completion screen 96, and the user can return to the screen display before the setting such as the viewing screen by selecting the completion button 96*a*.

Figure 13:
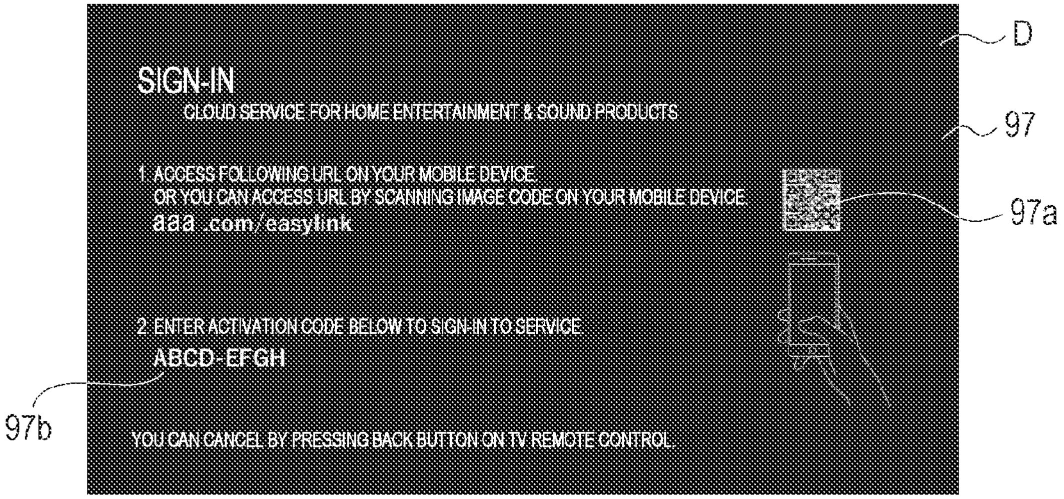
FIG. 13 is a diagram illustrating an example of an optimization procedure screen.

In a case where the optimization execution button 95*a* on the optimization selection screen 95 is selected, an optimization procedure screen 97 as illustrated in FIG. 13 is displayed on the display unit D.

The optimization procedure screen 97 displays a guidance code 97*a* as a two-dimensional code for guiding to a website for performing an individual optimization operation, an activation code 97*b* for specifying the television receiver 1, and the like. The guided website is, for example, a web page managed by the server device 5.

Alternatively, the guidance code may be a guidance code 97*a* for installing application software for performing an optimization operation. In this case, the user can easily start or install a specific application by operating the smartphone 6 to read the guidance code 97*a*.

Figure 14:
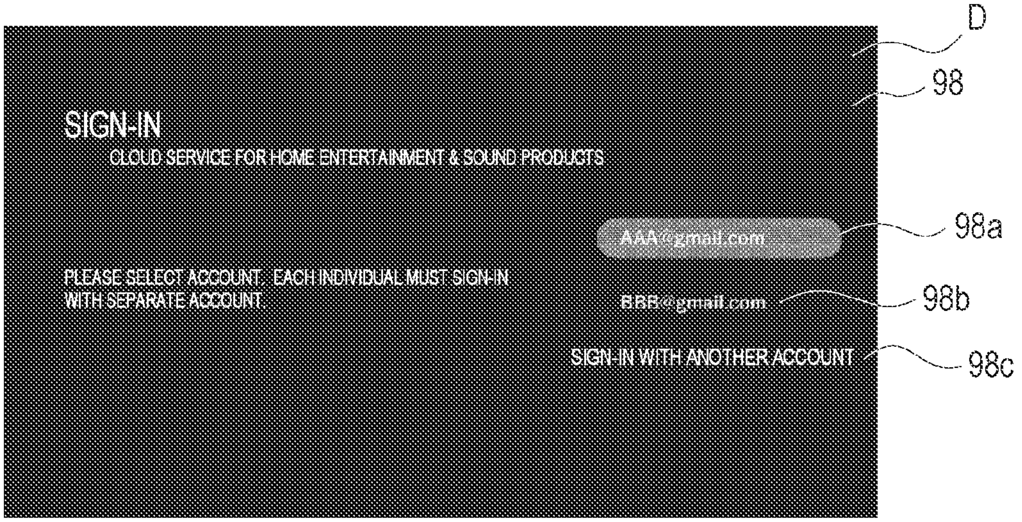
FIG. 14 is a diagram illustrating an example of an account selection screen.

Note that, in a case where the user information already managed by the server device 5 is stored in the storage unit 9 of the television receiver 1, an account selection screen 98 as illustrated in FIG. 14 may be displayed on the display unit D.

On the account selection screen 98, account options 98*a* and 98*b* for selecting an account and another account option 98*c* for selecting another account that is not displayed are arranged. For the account options 98*a* and 98*b*, various display modes such as a mail address, an account name, and a user name can be considered.

Figure 15:
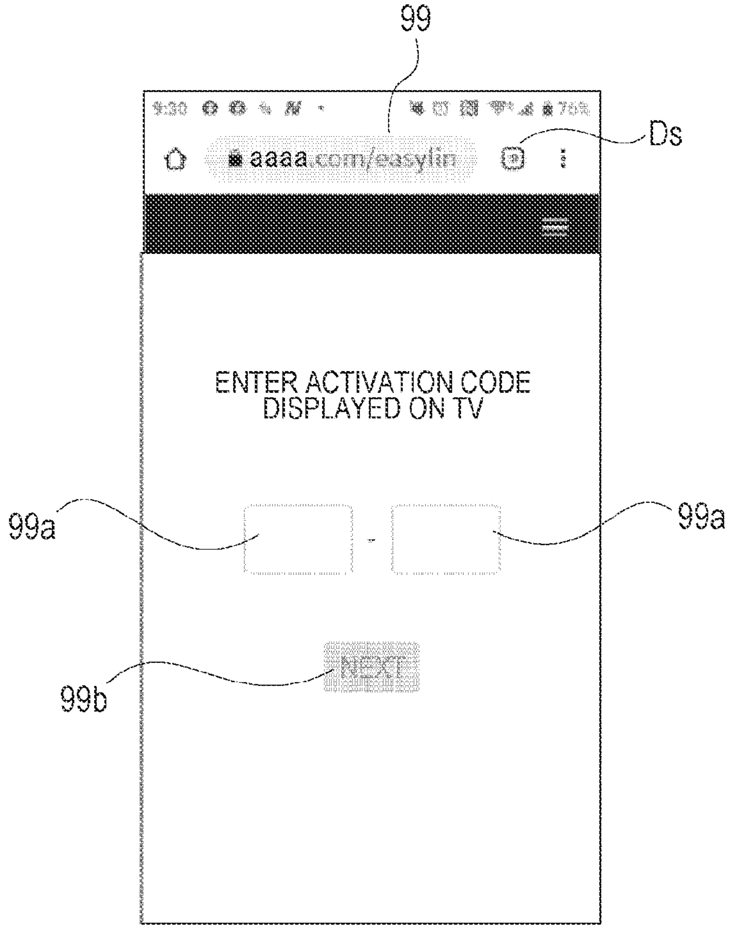
FIG. 15 is a diagram illustrating an example of a code input screen.

When the user images the guidance code 97*a* of the optimization procedure screen 97 with the smartphone 6 and moves to the website, for example, a code input screen 99 as illustrated in FIG. 15 is displayed on the display unit Ds (screen) of the smartphone 6.

On the code input screen 99, an input field 99*a* and a next button 99*b* for inputting an activation code are arranged. When the user inputs the character string displayed in the activation code 97*b* of the optimization procedure screen 97 illustrated in FIG. 13 into the input field 99*a* and selects the next button 99*b*, the activation code is transmitted to the server device 5.

The server device 5 specifies the television receiver 1 being used by the user on the basis of the activation code received from the smartphone 6.

The server device 5 notifies the smartphone 6 that the information for specifying the television receiver 1 has been received.

Figure 16:
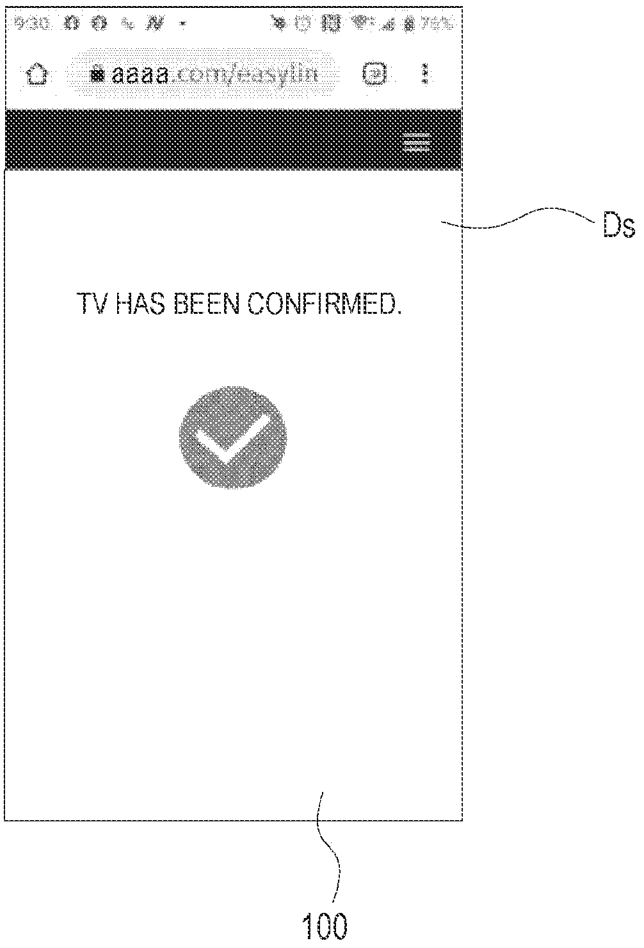
FIG. 16 is a diagram illustrating an example of a specification completion notification screen.

The specification completion notification screen 100 as illustrated in FIG. 16 is displayed on the display unit Ds of the smartphone 6 in response to the reception of the notification.

Figure 17:
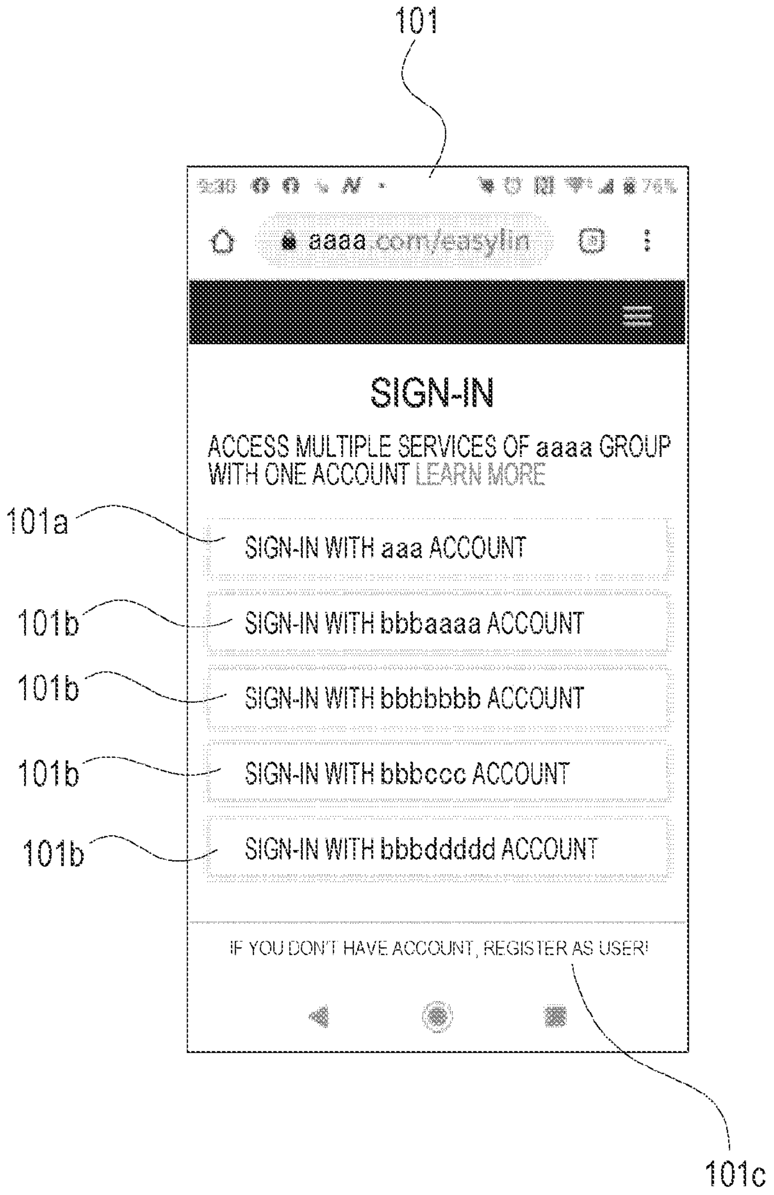
FIG. 17 is a diagram illustrating an example of a sign-in screen.

Subsequently, a sign-in screen 101 as illustrated in FIG. 17 is displayed on the display unit Ds of the smartphone 6.

This sign-in is for using various services provided by the server device 5. As one of various services provided by the server device 5, there are a service for calculating the head-related transfer function information HRTF described above and a service for managing the head-related transfer function information HRTF.

The sign-in screen 101 is a screen for sign-in by various methods in order to use the service provided by the server device 5.

Note that, in the following description, a service for the head-related transfer function information HRTF provided by the server device 5 will be referred to as an "HRTF service". Then, the account for using the HRTF service is described as "HRTF service account".

In addition, other services provided by the information processing device other than the server device 5, such as accounts of various social network services (SNSs), will be referred to as "other services". Then, accounts for using other services are described as "other service accounts".

On the sign-in screen 101, as various selection buttons for selecting a sign-in method, a first selection button 101*a* for sign-in with the HRTF service account and second selection buttons 101*b* for sign-in with other service accounts are arranged.

In addition, on the sign-in screen 101, an account creation button 101*c* for creating an HRTF service account for a user who does not have the account is arranged.

Figure 18:
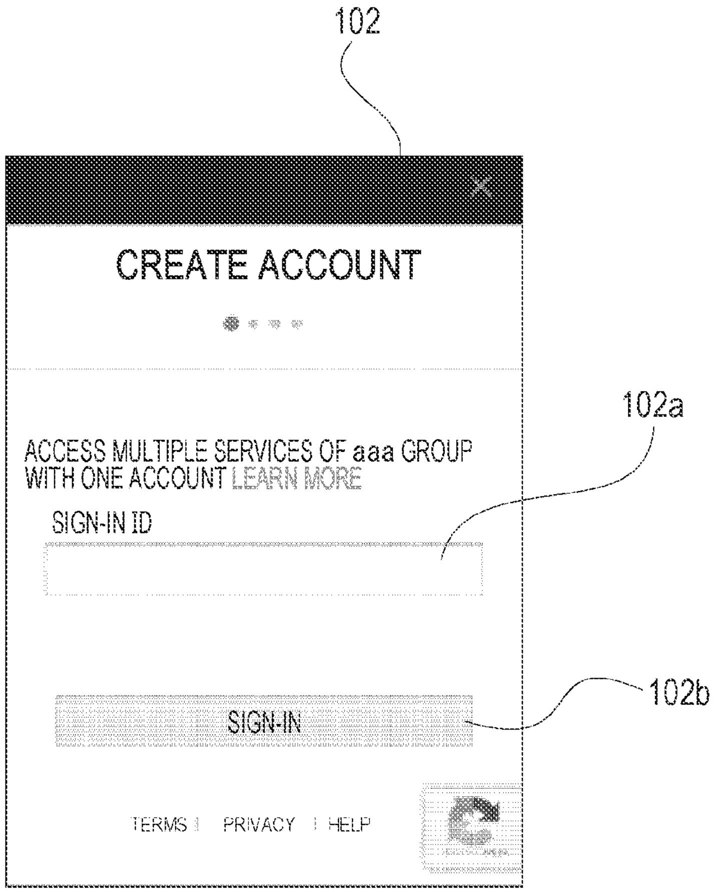
FIG. 18 is a diagram illustrating an example of a sign-in information input screen.

After the first selection button 101*a* or a second selection button 101*b* are selected, a sign-in information input screen 102 as illustrated in FIG. 18 is displayed on the display unit Ds of the smartphone 6.

On the sign-in information input screen 102, a sign-in information input field 102*a* and a sign-in button 102*b* for inputting sign-in information for other services are arranged. Note that, in addition to this, a creation button or the like for creating an account for another service may be arranged on the sign-in information input screen 102.

Figure 19:
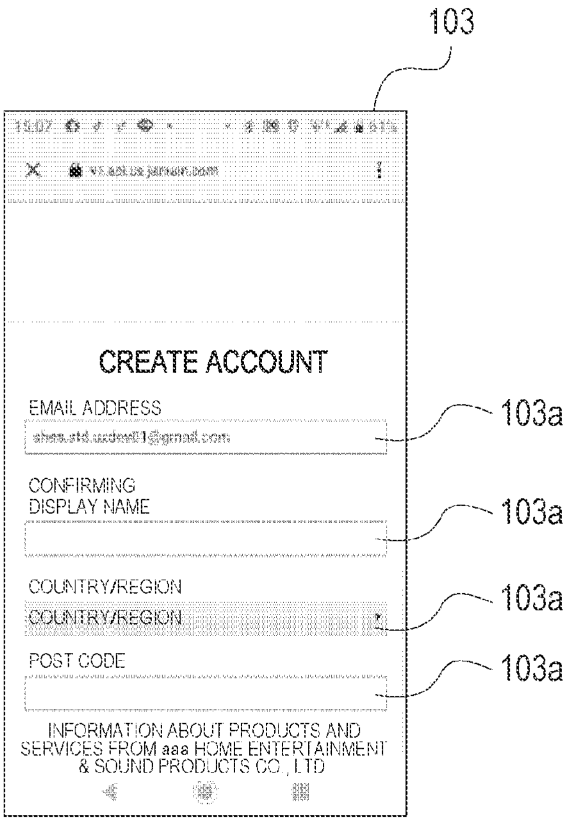
FIG. 19 is a diagram illustrating an example of an account creation screen.

In a case where the account creation button 101*c* on the sign-in screen 101 is selected or in a case where the sign-in of another service account is performed on the sign-in information input screen 102, an account creation screen 103 as illustrated in FIG. 19 is displayed on the display unit Ds of the smartphone 6.

The account creation screen 103 is a screen for creating an HRTF service account. On the account creation screen 103, an input field 103*a*, a creation button, and the like for inputting various types of user information are arranged.

Note that a sign-up screen for the HRTF service may be displayed for the user who has already created the HRTF service account.

In a case where the user has signed up for the HRTF service, the server device 5 determines whether or not the head-related transfer function information HRTF corresponding to the user who has signed up has been acquired, and in a case where the head-related transfer function information HRTF corresponding to the user has not been acquired, that is, in a case where the head-related transfer function information HRTF corresponding to the user is not stored in the database managed by the server device 5, the server device 5 proceeds to processing for calculating the head-related transfer function information HRTF corresponding to the user.

As the processing of acquiring the head-related transfer function information HRTF corresponding to the user, for example, the ear of the user is imaged using the smartphone 6, and estimation processing of the shape of the ear, calculation processing of the head-related transfer function information HRTF, processing of uploading the calculation result to the server device 5, and the like are executed. Note that the estimation processing of the shape of the ear and the calculation processing of the head-related transfer function information HRTF may be executed by either the smartphone 6 or the server device 5. Furthermore, as described above, an image obtained by imaging the ear may be stored in the server device 5.

On the other hand, in a case where the head-related transfer function information HRTF corresponding to the user is stored in the database managed by the server device 5, the process proceeds to processing of downloading the head-related transfer function information HRTF corresponding to the user to the television receiver 1.

Note that, after the user's ear is imaged or the like and the head-related transfer function information HRTF is calculated, the process similarly proceeds to processing of downloading the head-related transfer function information HRTF corresponding to the user to the television receiver 1.

Figure 20:
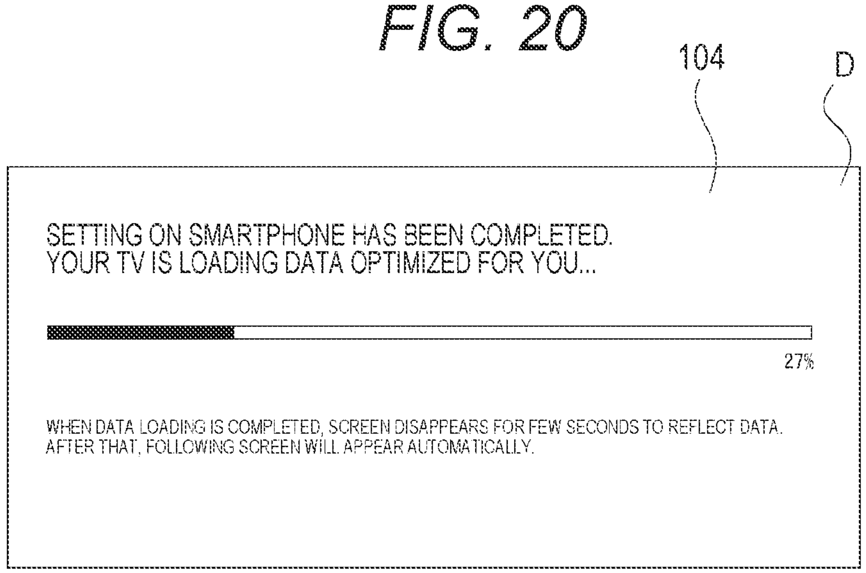
FIG. 20 is a diagram illustrating an example of a download screen.

In the download processing, a download screen 104 as illustrated in FIG. 20 is displayed on the display unit D of the television receiver 1.

A progress bar and the like are arranged on the download screen 104.

Figure 21:
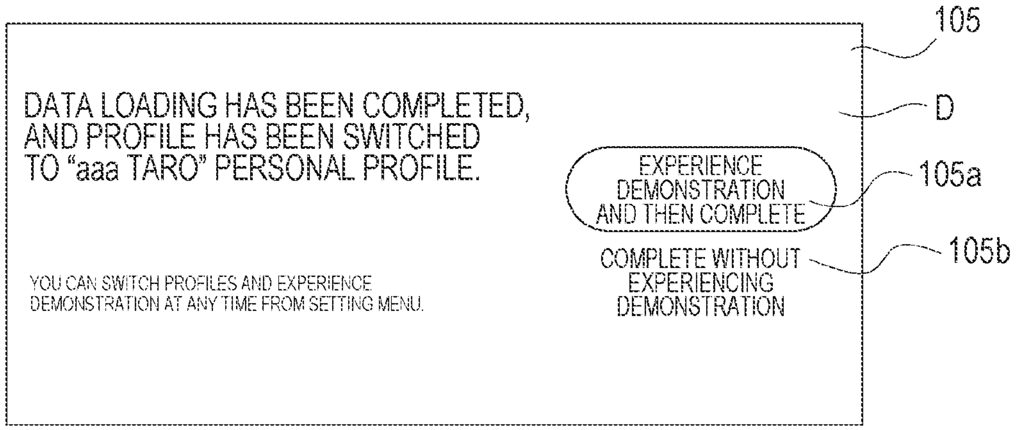
FIG. 21 is a diagram illustrating an example of a completion screen.

When the download is completed, a completion screen 105 as illustrated in FIG. 21 is displayed. On the completion screen 105, similarly to the initial setting completion notification screen 94 (see FIG. 10), a demonstration experience button 105*a* and a demonstration non-experience button 105*b* are arranged.

When the user selects the demonstration experience button 105*a*, it is possible to experience sound output to which the optimal head-related transfer function information HRTF corresponding to the user is applied. As a result, comparison can be made between a case where the standard head-related transfer function information HRTF is applied and a case where the head-related transfer function information HRTF corresponding to the user is applied. In particular, by making the content that can be experienced when the demonstration experience button 94*a* on the initial setting completion notification screen 94 is pressed and the content that can be experienced when the demonstration experience button 94*a* on the completion screen 105 is pressed the same, it is possible to more clearly grasp the difference.

Further, the server device 5 transmits user information (user ID, account information, and the like) to the television receiver 1. As a result, the television receiver 1 can acquire information for specifying the user who is using the television receiver 1.

The server device 5 manages the specified television receiver 1 and the user information in association with each other.

The description returns to FIG. 14.

When the account options 98*a* or 98*b* are selected on the account selection screen 98 illustrated in FIG. 14, the television receiver 1 determines whether or not the head-related transfer function information HRTF associated with the selected account is stored in the storage unit 9 or the server device 5.

In a case where the intended head-related transfer function information HRTF is stored in the storage unit 9 of the television receiver 1, the head-related transfer function information HRTF corresponding to the user is acquired from the storage unit 9 of the television receiver 1 and applied, thereby preparing for performing 3D surround reproduction.

On the other hand, in a case where the head-related transfer function information HRTF is not stored in the television receiver 1 but is stored in the server device 5, processing of downloading the head-related transfer function information HRTF corresponding to the user from the server device 5 to the television receiver 1 is performed while performing the UI processing of displaying each screen illustrated in FIGS. 20 and 21.

In a case where the head-related transfer function information HRTF corresponding to the user is not stored in either the storage unit 9 of the television receiver 1 or the server device 5, the calculation of the head-related transfer function information HRTF newly corresponding to the user, the download processing to the television receiver 1, and the like are performed by imaging the ear or the like using the smartphone 6.

By performing the UI processing so as to display various screens as described above, for example, when the user uses the television receiver 1 for the first time or the like, the head-related transfer function information HRTF corresponding to the user can be downloaded to the television receiver 1. As a result, the user can experience 3D surround reproduction to which the optimum head-related transfer function information HRTF corresponding to the user himself/herself is applied.

6. Flowchart

A flow of each processing executed by the television receiver 1, the smartphone 6, or the server device 5 will be described with reference to a flowchart in the attached drawings.

Note that each processing illustrated in each drawing is processing executed by the CPU 71 of the computer device as the television receiver 1, the smartphone 6, or the server device 5.

<6-1. Initial Setting Flow>

Figure 22:
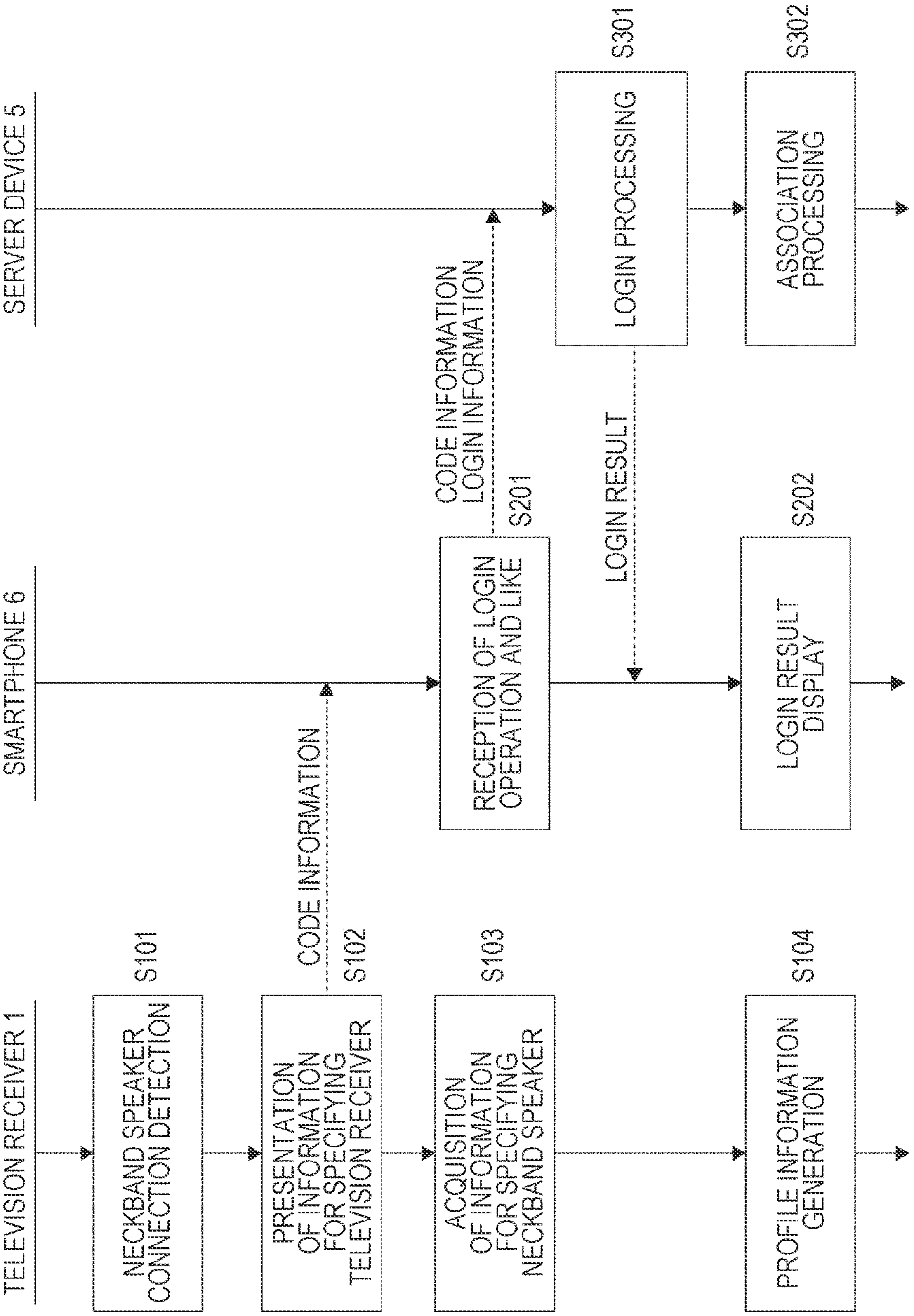
FIG. 22 is a flowchart illustrating an example of initial setting processing.

A flow of initial setting processing executed by each device in a case where the user associates the television receiver 1 with the neckband speaker 3A for the first time or the like will be described with reference to FIG. 22.

In step S101, the television receiver 1 performs connection detection of the neckband speaker 3A.

Subsequently, in step S102, the television receiver 1 presents information for specifying the television receiver. For example, the activation code 97*b* and the like in the optimization procedure screen 97 illustrated in FIG. 13 are displayed on the display unit D.

By inputting the displayed activation code 97*b* with the smartphone 6, the code information is provided to the smartphone 6. Note that, in a case where the television receiver 1 and the smartphone 6 are connected, code information such as an activation code, serial information for specifying the television receiver 1, and the like may be transmitted from the television receiver 1 to the smartphone 6.

After acquiring the code information, the smartphone 6 performs processing of receiving a login operation or the like in step S201. This processing is processing of receiving an input operation by the user on, for example, the sign-in screen 101 illustrated in FIG. 17, the sign-in information input screen 102 illustrated in FIG. 18, the account creation screen 103 illustrated in FIG. 19, or the like.

By performing these acceptance processes, the login information is transmitted from the smartphone 6 to the server device 5.

After receiving the login information, the server device 5 performs login processing in step S301. The result information of the login processing is transmitted to the smartphone 6. The smartphone 6 performs processing of displaying a menu screen or the like for the HRTF service according to the result of the login processing (step S202).

Note that the server device 5 may acquire code information, serial information, and the like for specifying the television receiver 1 together with the login information from the smartphone 6.

In step S302, the server device 5 performs association processing of the television receiver 1 with the user's account information on the basis of the received information.

Meanwhile, in step S103, the television receiver 1 acquires information for specifying the neckband speaker 3A from the neckband speaker 3A.

Subsequently, in step S104, the television receiver 1 performs processing of generating profile information about the user.

The profile information includes the neckband speaker 3A and the user information. The user information may be information input by the user using the television receiver 1, the user information associated with the television receiver 1 in the association processing in step S302 executed by the server device 5 may be acquired from the server device 5, or the user information input to the user as a result of the login operation in the smartphone 6 may be acquired from the smartphone 6.

Note that the television receiver 1 may transmit the information of the neckband speaker 3A specified in step S103 to the server device 5. In this case, in the processing of step S302 of the server device 5, processing of linking not only the information for specifying the television receiver 1 and the account information of the user but also the information for specifying the neckband speaker 3A may be executed.

<6-2. Flow of Acquiring Head-Related Transfer Function Information HRTF>

Figure 23:
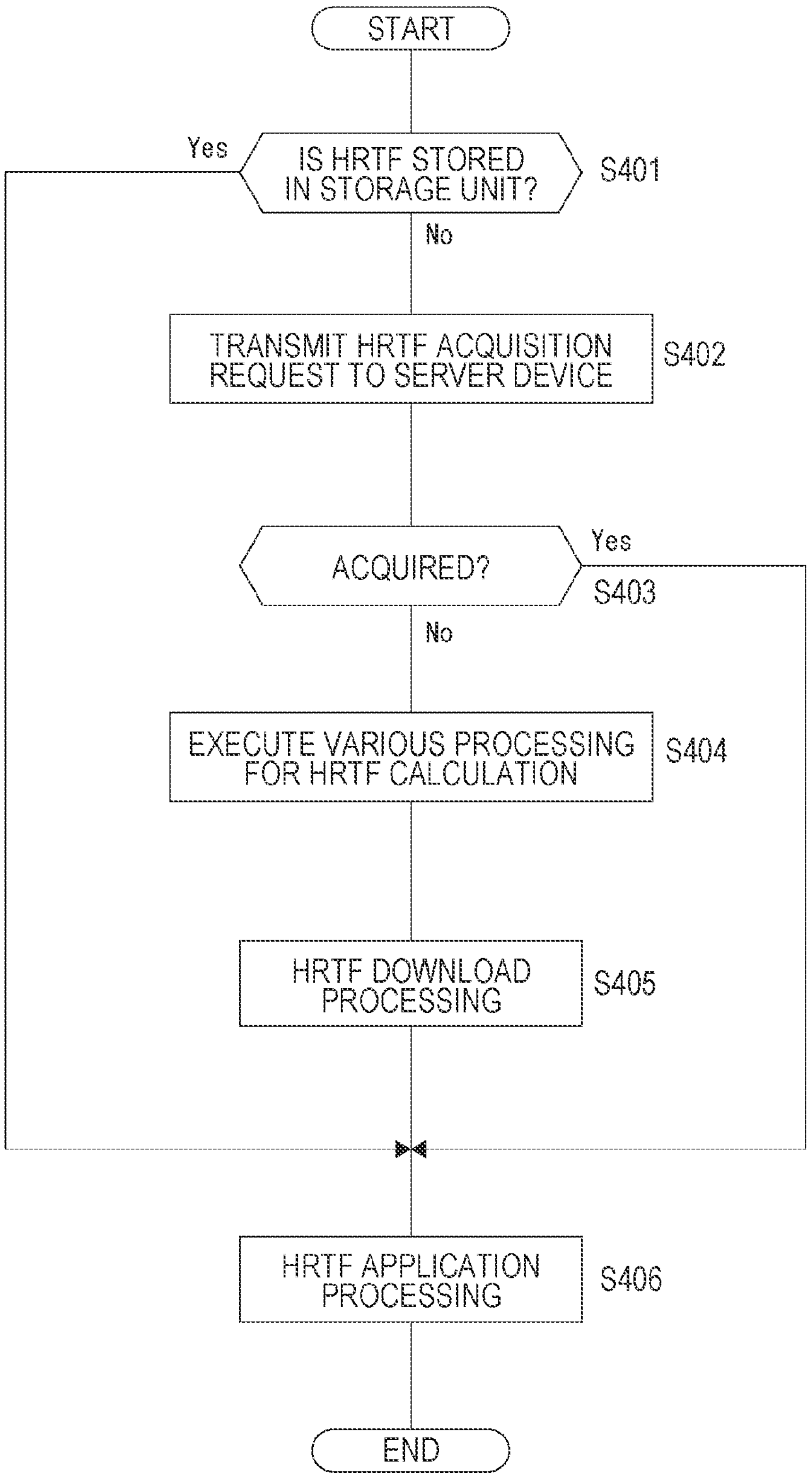
FIG. 23 is a flowchart illustrating an example of a flow of acquiring head-related transfer function information.

Processing executed by the television receiver 1 to acquire the head-related transfer function information HRTF corresponding to the user will be described with reference to FIG. 23.

In step S401, the television receiver 1 determines whether or not the head-related transfer function information HRTF about the user is stored in the storage unit 9. In a case where it is determined that the head-related transfer function information HRTF is not stored, the television receiver 1 performs request processing for acquiring the head-related transfer function information HRTF corresponding to the user with respect to the server device 5 in step S402.

In a case where the corresponding head-related transfer function information HRTF is managed by the server device 5, the head-related transfer function information HRTF is transmitted from the server device 5. In addition, in a case where the corresponding head-related transfer function information HRTF is not managed, a notification indicating that the head-related transfer function information HRTF is not stored in the server device 5 is given to the television receiver 1.

In step S403, the television receiver 1 determines whether or not the head-related transfer function information HRTF corresponding to the user has been acquired.

In a case of determining that the head-related transfer function information HRTF has not been acquired, the television receiver 1 executes various processes for calculating the head-related transfer function information HRTF of the user in step S404. For example, processing of displaying a two-dimensional code for installing a software application for imaging the ear on the display unit D or the like is executed.

Note that various types of processing for calculating the head-related transfer function information HRTF of the user may be executed in the smartphone 6, or may be executed by the television receiver 1 and the smartphone 6 cooperating with each other.

Furthermore, UI processing of causing the user to select whether or not to calculate the head-related transfer function information HRTF corresponding to the user may be executed.

In step S405, the television receiver 1 performs processing of downloading the head-related transfer function information HRTF corresponding to the user.

Subsequently, in step S406, the television receiver 1 performs processing of applying the head-related transfer function information HRTF to the pre-correction audio signal SA to generate the post-correction audio signal SB.

As a result, the user can enjoy the sound output based on the post-correction audio signal SB to which the head-related transfer function information HRTF corresponding to the user himself/herself is applied.

<6-3. Flow of Applying Head-Related Transfer Function Information HRTF>

Figure 24:
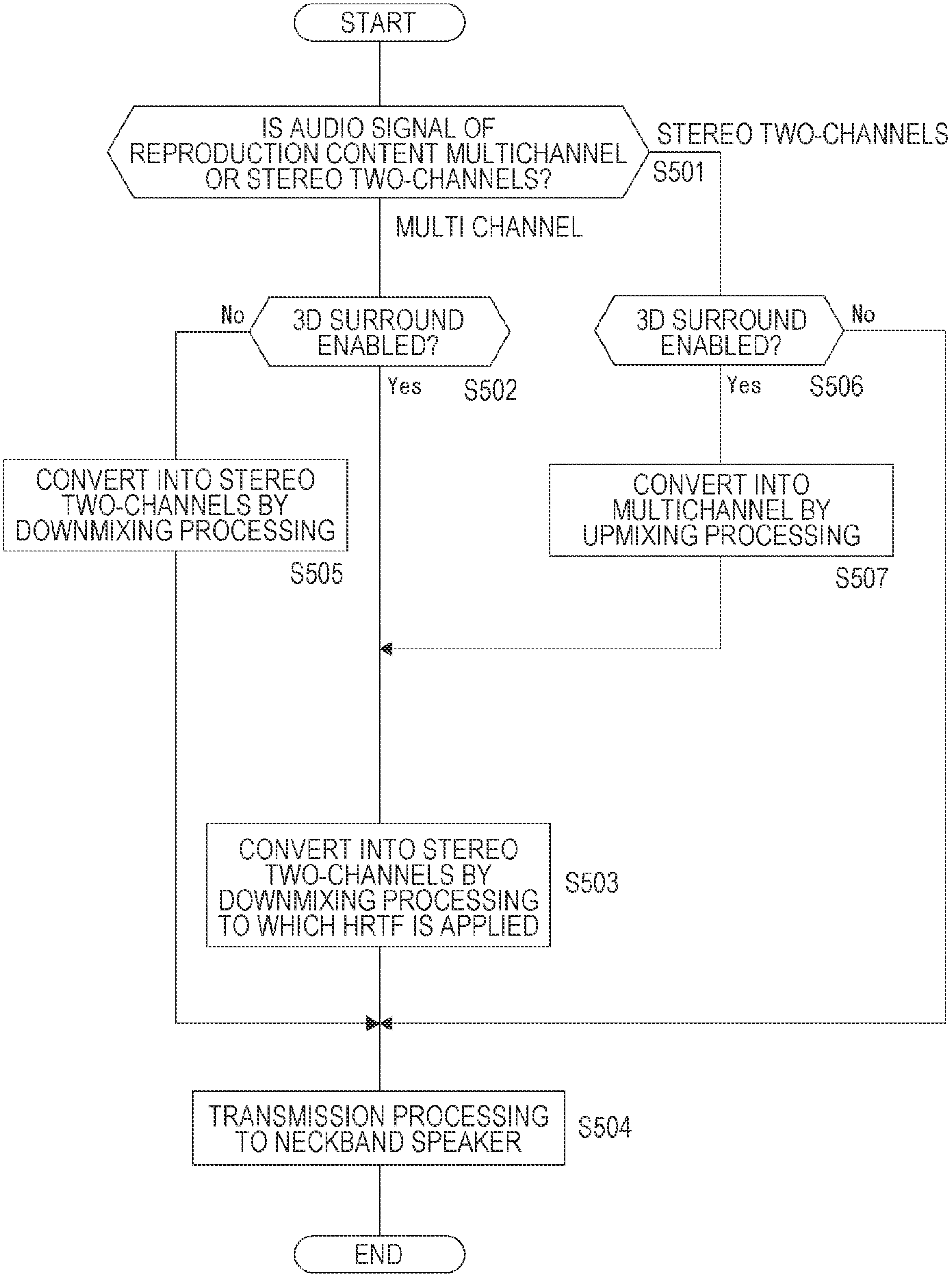
FIG. 24 is a flowchart illustrating an example of a flow of applying head-related transfer function information.

The television receiver 1 performs processing of determining whether or not to apply the head-related transfer function information HRTF on the basis of various audio signals. This will be specifically described with reference to FIG. 24.

In step S501, the television receiver 1 determines whether the audio signal of the reproduction content is multichannel or stereo two-channel. The audio signal to be determined is the pre-correction audio signal SA.

In a case where it is determined that the audio signal is multichannel, the television receiver 1 determines whether or not the 3D surround setting is enabled in step S502. The 3D surround setting may be appropriately settable by the user. In other words, the UI processing unit 22 may execute UI processing capable of switching ON/OFF of the 3D surround setting so that the user can switch the 3D surround setting. Alternatively, the 3D surround setting may be automatically set on the basis of the audio signal before correction or the information of the reproduction content.

In a case where it is determined that the 3D surround setting is enabled, in step S503, the television receiver 1 generates the post-correction audio signal SB converted into stereo two-channels by downmixing processing to which the head-related transfer function information HRTF corresponding to the user is applied.

In step S504, the television receiver 1 transmits the post-correction audio signal SB to the neckband speaker 3A. As a result, the user can experience optimal 3D surround using the neckband speaker 3A.

In a case where it is determined in step S502 that 3D surround is not enabled, that is, in a case where it is determined that the audio signal of the reproduction content is multichannel but 3D surround is not enabled, the television receiver 1 performs downmixing processing in step S505 and performs stereo two-channel conversion.

Then, in step S504, the television receiver 1 transmits the stereo two-channel audio signal to the neckband speaker 3A.

In a case where it is determined in step S501 that the audio signal of the reproduction content is the stereo two-channel, the television receiver 1 determines in step S506 whether or not the 3D surround setting is enabled.

In a case where it is determined that the 3D surround setting is enabled, the television receiver 1 generates the pre-correction audio signal SA multichannelized by upmixing processing in step S507.

Subsequently, the television receiver 1 performs downmixing processing to which the head-related transfer function information HRTF is applied in step S503 to generate the post-correction audio signal SB, and transmits the post-correction audio signal SB to the neckband speaker 3A in step S504.

In a case where it is determined in step S506 that 3D surround is not enabled, that is, in a case where it is determined that the audio signal of the reproduction content is stereo two-channel and 3D surround is not enabled, the television receiver 1 transmits the audio signal of stereo two-channel to the neckband speaker 3A as it is in step S504.

In this manner, the television receiver 1 performs appropriate processing on the audio signal on the basis of the audio signal of the reproduction content and the 3D surround setting, and transmits the processed audio signal to the neckband speaker 3A. As a result, the user can enjoy the optimum sound output.

7. Modifications

Figure 25:
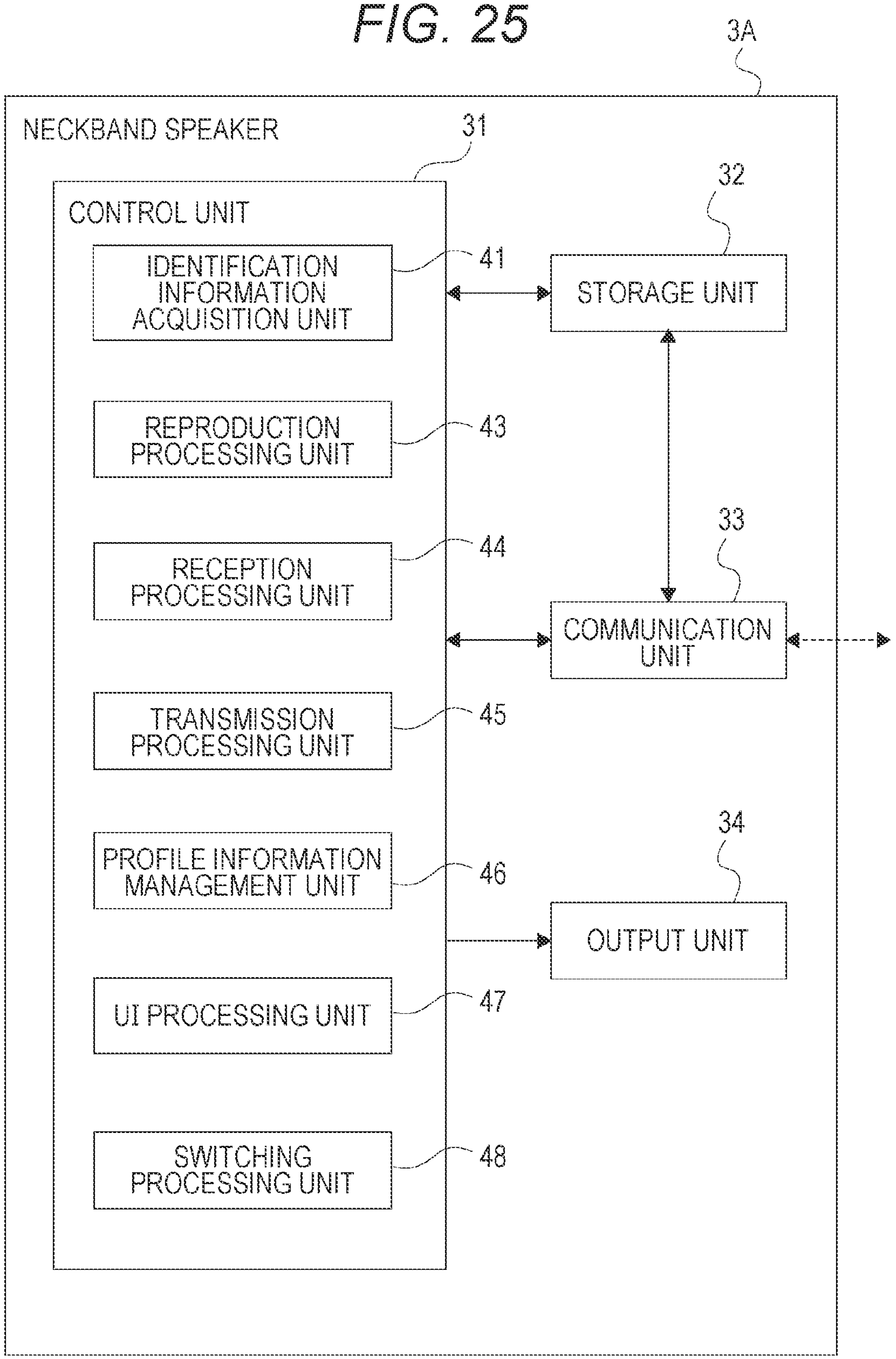
FIG. 25 is a diagram illustrating another configuration example of the neckband speaker.

In the above-described example, an example in which one user uses the neckband speaker 3A has been described, but here, a case where a plurality of users uses one neckband speaker 3A will be described. A configuration example of the neckband speaker 3A in this case will be described with reference to FIG. 25. Note that description of configurations similar to those illustrated in FIG. 4 will be omitted as appropriate.

The neckband speaker 3A according to the present modification is configured to manage profile information for a plurality of users.

Specifically, the neckband speaker 3A includes a control unit 31, a storage unit 32, a communication unit 33, and an output unit 34.

The control unit 31 functions as an identification information acquisition unit 41, a reproduction processing unit 43, a reception processing unit 44, a transmission processing unit a profile information management unit 46, a user interface processing unit (UI processing unit) 47, and a switching processing unit 48.

The profile information management unit 46 can manage a plurality of pieces of profile information. One piece of profile information includes information for specifying the user.

In a case where a user wearing the neckband speaker 3A is specified, the profile information management unit 46 may be able to transmit profile information corresponding to the user to the television receiver 1. As a result, the television receiver 1 generates the post-correction audio signal SB to which the head-related transfer function information HRTF corresponding to the user is applied.

The user may be specified, for example, in accordance with a user's selection, in accordance with a mode in which the user wears the neckband speaker 3A, or by analyzing a voiceprint or the like of the worn user. Other than this, various methods are conceivable.

The profile information management unit 46 can perform registration processing, deletion processing, and the like of profile information.

The UI processing unit 47 performs, for example, processing of detecting a user operation on an operator for selecting profile information, audio output processing for providing notification of the selected profile information, and the like. Furthermore, in a case where the neckband speaker 3A includes a small display unit, the notification processing may be performed using the display unit.

The switching processing unit 48 switches the profile information. As a result, the profile information is switched every time the wearing user changes, and the switched profile information is transmitted to the television receiver 1 by the profile information management unit 46.

In the television receiver 1, the appropriate head-related transfer function information HRTF can be selected on the basis of the profile information received from the neckband speaker 3A, and the post-correction audio signal SB can be generated.

Other modifications will be described.

In the above-described example, an example in which there is one piece of head-related transfer function information HRTF corresponding to one user has been described, but there may be a plurality of pieces of head-related transfer function information HRTF.

For example, it is conceivable that various audio signal reproduction devices have different characteristics. Therefore, in a case where one user uses a plurality of audio signal reproduction devices, the head-related transfer function information HRTF may be generated and managed for each audio signal reproduction device.

Furthermore, different head-related transfer function information HRTF may be generated according to the number and positions of the virtual sound sources. As a result, a plurality of types of head-related transfer function information HRTF corresponding to one user is managed, and the user can experience sound output to which appropriate head-related transfer function information HRTF is applied according to content to be reproduced.

Further, the television receiver 1 may manage the audio signal reproduction devices and the user in association with each other. That is, the television receiver 1 may switch the head-related transfer function information HRTF to be applied to the pre-correction audio signal SA to one corresponding to a new user by detecting that the connected audio signal reproduction device is changed and estimating that the user is changed.

The television receiver 1 may execute processing of providing notification of which user the head-related transfer function information HRTF currently applied belongs to. Further, this notification processing may be executed by an audio signal reproduction device such as the neckband speaker 3A instead of the television receiver 1.

8. Summary

As described above, the television receiver 1 as the information processing device includes the signal acquisition unit 25 that acquires the audio signal, the storage unit 9 that stores the head-related transfer function information HRTF corresponding to the user, the determination processing unit 23 that determines whether or not the head-related transfer function information HRTF corresponding to the user is stored in the storage unit 9, the transfer function acquisition unit 24 that acquires the head-related transfer function information HRTF corresponding to the user, and the function application unit 26 that applies the head-related transfer function information HRTF corresponding to the user to the audio signal (pre-correction audio signal SA).

Furthermore, in a case where the head-related transfer function information HRTF corresponding to the user is not stored in the storage unit 9, the transfer function acquisition unit 24 acquires the head-related transfer function information HRTF corresponding to the user from another information processing device (for example, the server device 5).

As a result, for example, even in a state where the head-related transfer function information HRTF corresponding to the user is not stored in a newly purchased information processing device (the television receiver 1, the headphone, or the like), the head-related transfer function information HRTF unique to the user calculated so far can be acquired from another information processing device.

Therefore, it is not necessary to newly execute the processing for calculating (generating) the head-related transfer function information HRTF unique to the user, and the processing load can be reduced. In addition, the user can also quickly experience the optimal sound output to which the head-related transfer function information HRTF that has already been calculated is applied, and the convenience is improved.

Note that the audio signal reproduction device such as the neckband speaker 3A can function as such an information processing device. That is, the neckband speaker 3A may include the signal acquisition unit 25 that acquires the pre-correction audio signal SA, the storage unit 32 that stores the head-related transfer function information HRTF, the determination processing unit 23, the transfer function acquisition unit 24, and the function application unit 26. As a result, since the post-correction audio signal SB is generated from the pre-correction audio signal SA in the neckband speaker 3A, a processing load of generating the post-correction audio signal SB in the television receiver 1 is reduced. In particular, in a case where each post-correction audio signal SB corresponding to a plurality of users is generated in one television receiver 1, there is a possibility that an increase in the processing load of the television receiver 1 becomes a problem. However, according to the present configuration, such a problem can be avoided.

The transfer function acquisition unit 24 in the television receiver 1 may acquire the head-related transfer function information HRTF corresponding to the user from the storage unit 9, and acquire the head-related transfer function information HRTF corresponding to the user from another information processing device (server device 5) in a case where the head-related transfer function information HRTF corresponding to the user is not stored in the storage unit 9.

As a result, in a case where the corresponding head-related transfer function information HRTF is stored in the storage unit 9 of the television receiver 1, it is not necessary to issue an acquisition request to another information processing device.

As a result, the communication amount can be reduced, and the processing load of other information processing devices can be reduced.

The television receiver 1 may include the user interface processing unit 22 that performs user interface processing (UI processing) for obtaining the head-related transfer function information HRTF corresponding to the user in a case where the head-related transfer function information HRTF corresponding to the user is not stored in the storage unit 9 and cannot be acquired from another information processing device (server device 5).

For example, processing of displaying information for downloading an application for calculating the head-related transfer function information HRTF to the user terminal (smartphone 6) or the like is executed.

As a result, the user can smoothly perform the operation for acquiring the head-related transfer function information HRTF. In addition, by causing the user to perform an operation according to the display, it is possible to cause the user to perform an appropriate operation, and it is possible to reduce the possibility of executing an erroneous operation or the like.

Note that the audio signal reproduction device such as the neckband speaker 3A can function as such an information processing device.

The user interface processing unit 22 in the television receiver 1 may execute processing of selecting whether or not to execute processing for obtaining the head-related transfer function information HRTF corresponding to the user as the user interface processing. For example, the user can select not to execute the processing for obtaining the head-related transfer function information HRTF corresponding to the user by selecting the suspend button 91*b* in FIG. 6, the optimization non-execution button 95*b* in FIG. 11, or the like.

As a result, it is possible to express an intention to avoid the processing for obtaining the head-related transfer function information HRTF in a case where the user saves time and effort for calculating the head-related transfer function information HRTF unique to the user.

Therefore, since it is not necessary for the user to execute processing that the user feels unnecessary, it is possible to improve convenience of the user.

The user interface processing unit 22 in the television receiver 1 may execute processing of displaying guidance information (two-dimensional code, link information of a web page, or the like) for causing an application to be installed on the user terminal (smartphone 6) as the user interface processing.

As a result, the user can install an appropriate application by operating according to the display.

Therefore, time and effort for searching for an application or the like can be saved, and user convenience can be improved. In addition, it is possible to prevent the user from giving up the experience of the sound output to which the head-related transfer function information HRTF is applied without finding an appropriate application.

The television receiver 1 may include the transmission processing unit 27 that transmits an audio signal to a reproduction device (audio signal reproduction device).

Such an information processing device is, for example, the television receiver 1, a personal computer, a tablet terminal, or the like. In particular, it is suitable for an information processing terminal which is highly likely to be shared by a plurality of persons. Then, the reproduction device is a headphone, an earphone, or the like worn by the user. Headphones include headphones of a type to be worn on the head so as to cover the ears, headphones of a neck hanging type, and the like.

Even in a state where the head-related transfer function information HRTF corresponding to the user is not stored in the information processing device such as the television receiver 1, the head-related transfer function information HRTF unique to the user calculated so far can be acquired from the television receiver 1 or the like as another information processing device.

The television receiver 1 may include the detection unit 21 that performs connection detection of a reproduction device (audio signal reproduction device), and the user interface processing unit 22 that performs user interface processing of selecting whether or not to apply the head-related transfer function information HRTF to the audio signal in a case where the detection unit 21 detects the connection of the reproduction device.

As a result, for example, when the headphone (neckband speaker 3A) is connected to the television receiver 1, it is possible to perform display for causing the display unit D of the television receiver 1 to select whether or not to perform surround reproduction using the head-related transfer function information HRTF.

Therefore, for example, it is possible to select not only to perform sound reproduction based on the head-related transfer function information HRTF unique to the user in a case of reproducing content more appropriate when surround reproduction such as music is performed, but also to select to perform sound reproduction not using the head-related transfer function information HRTF in a case of reproducing content that does not require surround reproduction such as news.

In a case where it is selected to perform sound reproduction not using the head-related transfer function information HRTF, the processing load of the information processing device can be reduced.

The function application unit 26 in the television receiver 1 may be capable of executing first application processing of applying the head-related transfer function information HRTF corresponding to the user to the audio signal and second application processing of applying the standard head-related transfer function information HRTF to the audio signal.

For example, even in a case where the user is busy and does not have time to perform an operation or the like for acquiring the head-related transfer function information HRTF, sound output can be performed using the standard head-related transfer function information HRTF.

As a result, even if the head-related transfer function information HRTF unique to the user cannot be acquired, sound reproduction having a certain degree of stereoscopic sound effect can be performed. In addition, there are users who feel troublesome about the operation for acquiring the head-related transfer function information HRTF unique to the users or the like. However, by allowing a user to experience sound reproduction to which the standard head-related transfer function information HRTF is applied, it is possible to give a trigger for the user to reconsider that the user wants to experience optimal sound reproduction based on the head-related transfer function information HRTF of the user.

The user interface processing unit 22 in the television receiver 1 may be capable of executing user interface processing of selecting which of the first application processing and the second application processing is to be executed in a case where connection of a reproduction device (audio signal reproduction device) is detected.

Specifically, the first processing can be executed by selecting the optimization execution button 95*a* in FIG. 11, and the second processing can be executed by selecting the demonstration experience button 94*a* in FIG. 10.

As a result, the user can select whether to experience sound reproduction to which the head-related transfer function information HRTF unique to the user is applied or to experience sound reproduction to which the head-related transfer function information HRTF common to all users is applied.

Therefore, it is possible to select whether or not to execute the processing for calculating the head-related transfer function information HRTF in consideration of the schedule of the user, to select whether or not to calculate the head-related transfer function information HRTF of an individual in consideration of the interest in the surround reproduction, or the like.

The user interface processing unit 22 in the television receiver 1 may be capable of executing user interface processing for allowing the user to experience a sound field constructed by the audio signal (post-correction audio signal SB) to which the head-related transfer function information HRTF has been applied.

For example, some users do not notice that sound reproduction to which the head-related transfer function information HRTF is applied is possible.

In order to notify such a user that the sound reproduction to which the head-related transfer function information HRTF is applied is possible, the user interface processing for allowing the user to experience the sound field constructed by the audio signal to which the head-related transfer function information HRTF is applied is executed, so that it is possible to give the user awareness and give a trigger for performing an operation for acquiring the head-related transfer function information HRTF.

The user interface processing unit 22 in the television receiver 1 may be capable of executing user interface processing for performing login processing for the user.

When the user performs a login operation according to the login processing, the user can be specified.

As a result, the head-related transfer function information HRTF specialized for the specified user can be acquired, and the optimum sound output for the user can be provided.

The user interface processing unit 22 in the television receiver 1 may be capable of executing user interface processing for performing login processing for the user and user interface processing for allowing the user to experience the sound field constructed by the audio signal (post-correction audio signal SB) generated by the second application processing in a case where the transfer function acquisition unit 24 cannot acquire the head-related transfer function information HRTF corresponding to the user specified as a result of the login processing.

The case where the head-related transfer function information HRTF corresponding to the user specified by the login processing cannot be acquired is, for example, a case where the user has not experienced the sound output to which the head-related transfer function information HRTF specialized for the user himself/herself is applied or the like In such a case, by executing processing for allowing the user to experience the sound output to which the head-related transfer function information HRTF is applied, it is possible to make the user notice the attraction of the sound output to which the head-related transfer function information HRTF is applied.

The storage unit 9 in the television receiver 1 may store the head-related transfer function information HRTF corresponding to the user and a reproduction device (audio signal reproduction device) in association with each other.

As a result, it is possible to acquire the head-related transfer function information HRTF corresponding to the user specified by the login processing or the like without performing communication processing with another information processing device (for example, the server device 5 or the like).

Therefore, it is possible to provide the optimal sound output to the logged-in user. Furthermore, even in a case where the information processing device does not have a communication function, it is possible to provide a sound output suitable for the user.

The storage unit 9 in the television receiver 1 may store a plurality of combinations of the head-related transfer function information HRTF and the reproduction device (audio signal reproduction device) corresponding to the user.

As a result, even in a case where a plurality of users shares and uses the information processing device, the head-related transfer function information HRTF corresponding to each user can be acquired.

Therefore, an optimal sound output can be provided to each user.

The television receiver 1 may include a user interface processing unit capable of executing user interface processing for switching between an application state in which the head-related transfer function information HRTF is applied to the audio signal and a non-application state in which the head-related transfer function information HRTF is not applied to the audio signal. That is, the user interface processing unit 22 may be capable of executing user interface processing of switching which of the pre-correction audio signal SA and the post-correction audio signal SB is to be transmitted to the reproduction device.

As a result, for example, the user can switch the application or non-application of the head-related transfer function information HRTF according to the contents of the content.

Therefore, it is possible to provide an optimum sound output as necessary. In addition, in a case where the state is switched to the non-application state in which the head-related transfer function information HRTF is not applied, the processing load of the information processing device is reduced.

The above-described information processing device may include a user interface processing unit capable of executing user interface processing for switching the head-related transfer function information corresponding to the user to the head-related transfer function information corresponding to another user.

As a result, in a case where a plurality of users uses the information processing device, the optimal head-related transfer function information can be applied to each user.

Therefore, each user can experience the optimal sound output.

The information processing device described above may be the television receiver 1 including a display unit capable of video display.

As a result, when a user whose head-related transfer function information HRTF is not stored in the television receiver 1 uses the television receiver 1, the television receiver 1 executes processing of acquiring the head-related transfer function information HRTF corresponding to the user from another information processing device such as the server device 5.

As a result, the head-related transfer function information HRTF unique to the user already calculated by the smartphone 6 or the like can also be used in the television receiver 1. Therefore, it is not necessary to execute the calculation processing of the head-related transfer function information HRTF again for the user who has already calculated the head-related transfer function information HRTF, so that the processing load on the television receiver 1 can be reduced.

The television receiver 1 may include the user interface processing unit 22 capable of executing the user interface processing for performing the login processing for the user and the user interface processing for causing the display unit D to display the information for installing the application for calculating the head-related transfer function information HRTF corresponding to the user on the user terminal (for example, the smartphone 6) in a case where the head-related transfer function information HRTF corresponding to the user specified as a result of the login processing is not stored in the storage unit 9 and cannot be acquired from another information processing device (for example, the server device 5 or the like).

Furthermore, the transfer function acquisition unit 24 may acquire the head-related transfer function information HRTF corresponding to the user calculated on the basis of the information transmitted from the user terminal from another information processing device.

The user who uses the television receiver 1 can be specified by the login processing. Furthermore, as a result, the head-related transfer function information HRTF corresponding to the specified user can be acquired from the storage unit 9 or another information processing device. Furthermore, in a case where the head-related transfer function information HRTF corresponding to the specified user cannot be acquired, for example, the user is guided to use a camera application for acquiring the shape of the ear of the user so that the head-related transfer function information HRTF corresponding to the user can be calculated.

As a result, it is possible to enjoy the sound output to which the head-related transfer function information HRTF corresponding to the user is applied.

Note that the effects described herein are only examples, and the effects of the present technology are not limited to these effects. Additional effects may also be obtained.

9. Present Technology (1)

An information processing device including:

a signal acquisition unit that acquires an audio signal;

a storage unit that stores head-related transfer function information corresponding to a user;

a determination processing unit that determines whether or not the head-related transfer function information corresponding to the user is stored in another information processing device;

a transfer function acquisition unit that acquires the head-related transfer function information corresponding to the user; and a function application unit that applies the head-related transfer function information corresponding to the user to the audio signal.

(2)

The information processing device according to (2), in which the transfer function acquisition unit acquires the head-related transfer function information corresponding to the user from the storage unit, and acquires the head-related transfer function information corresponding to the user from the another information processing device in a case where the head-related transfer function information corresponding to the user is not stored in the storage unit.

(3)

The information processing device according to (2), further including a user interface processing unit that performs user interface processing for obtaining the head-related transfer function information corresponding to the user in a case where the head-related transfer function information corresponding to the user is not stored in the storage unit and cannot be acquired from the another information processing device.

(4)

The information processing device according to (3), in which the user interface processing unit executes processing of selecting whether or not to execute processing for obtaining the head-related transfer function information corresponding to the user as the user interface processing.

(5)

The information processing device according to any one of (3) to (4), in which the user interface processing unit executes processing of displaying guidance information for causing an application to be installed on a user terminal as the user interface processing.

(6)

The information processing device according to any one of (1) to (4), further including a transmission processing unit that transmits the audio signal to a reproduction device.

(7)

The information processing device according to (6), further including:

a detection unit that performs connection detection of the reproduction device; and a user interface processing unit that performs user interface processing of selecting whether or not to apply the head-related transfer function information to the audio signal in a case where the detection unit detects connection of the reproduction device.

(8)

The information processing device according to (7), in which the function application unit is capable of executing first application processing of applying the head-related transfer function information corresponding to the user to the audio signal and second application processing of applying standard head-related transfer function information to the audio signal.

(9)

The information processing device according to (8), in which the user interface processing unit is capable of executing user interface processing of selecting which of the first application processing and the second application processing is executed in a case where connection of the reproduction device is detected.

(10)

The information processing device according to any one of (7) to (9), in which the user interface processing unit is capable of executing user interface processing for allowing the user to experience a sound field constructed by the audio signal to which the head-related transfer function information has been applied.

(11)

The information processing device according to any one of (7) to (10), in which the user interface processing unit is capable of executing user interface processing for performing login processing for the user.

(12)

The information processing device according to (9), in which the user interface processing unit is capable of executing user interface processing for performing login processing for the user, and user interface processing for allowing the user to experience a sound field constructed by the audio signal generated by the second application processing in a case where the transfer function acquisition unit cannot acquire the head-related transfer function information corresponding to the user specified as a result of the login processing.

(13)

The information processing device according to any one of (6) to (12), in which the storage unit stores the head-related transfer function information corresponding to the user and the reproduction device in association with each other.

(14)

The information processing device according to (13), in which the storage unit stores a plurality of combinations of the head-related transfer function information corresponding to the user and the reproduction device.

(15)

The information processing device according to any one of (1) to (14), further including a user interface processing unit capable of executing user interface processing for switching between an application state in which the head-related transfer function information is applied to the audio signal and a non-application state in which the head-related transfer function information is not applied to the audio signal.

(16)

The information processing device according to any one of (1) to (15), further including a user interface processing unit capable of executing user interface processing for switching the head-related transfer function information corresponding to the user to the head-related transfer function information corresponding to another user.

(17)

The information processing device according to any one of (1) to (16), in which the information processing device is a television receiver including a display unit capable of video display.

(18)

The information processing device according to any one of (17), further including a user interface processing unit capable of executing: user interface processing for performing login processing for a user; and user interface processing for displaying, on the display unit, information for causing an application for calculating the head-related transfer function information corresponding to the user to be installed on a user terminal in a case where the head-related transfer function information corresponding to the user specified as a result of the login processing is not stored in the storage unit and cannot be acquired from another information processing device, in which the transfer function acquisition unit acquires the head-related transfer function information corresponding to the user calculated on the basis of information transmitted from the user terminal from the another information processing device.

(19)

An information processing method executed by an information processing device, the information processing method including:

acquiring an audio signal;

storing head-related transfer function information corresponding to a user;

determining whether or not the head-related transfer function information corresponding to the user is stored in another information processing device;

acquiring the head-related transfer function information corresponding to the user; and applying the head-related transfer function information corresponding to the user to the audio signal.

REFERENCE SIGNS LIST

1 Television receiver
3A Neckband speaker (reproduction device)
5 Server device (another information processing device)
6 Smartphone (user terminal)
9 Storage unit
21 Detection unit
22 User interface processing unit (UI processing unit)
23 Determination processing unit
24 Transfer function acquisition unit
25 Signal acquisition unit
26 Function application unit
27 Transmission processing unit
HRTF Head-related transfer function information
SA Pre-correction audio signal
SB Post-correction audio signal

What is claimed is:

1. An information processing device, comprising:

a signal acquisition unit that acquires an audio signal;

a storage unit that stores head-related transfer function information corresponding to a user;

a determination processing unit that determines whether or not the head-related transfer function information corresponding to the user is stored in another information processing device;

a transfer function acquisition unit that acquires the head-related transfer function information corresponding to the user, wherein the transfer function acquisition unit acquires the head-related transfer function information corresponding to the user from the storage unit, and acquires the head-related transfer function information corresponding to the user from the another information processing device in a case where the head-related transfer function information corresponding to the user is not stored in the storage unit;

a function application unit that applies the head-related transfer function information corresponding to the user to the audio signal; and, a user interface processing unit that performs user interface processing for obtaining the head-related transfer function information corresponding to the user in a case where the head-related transfer function information corresponding to the user is not stored in the storage unit and cannot be acquired from the another information processing device, wherein the user interface processing unit executes processing of displaying guidance information for causing an application to be installed on a user terminal as the user interface processing.

2. The information processing device according to claim 1, further comprising a transmission processing unit that transmits the audio signal to a reproduction device.

3. The information processing device according to claim 2, further comprising:

a detection unit that performs connection detection of the reproduction device; and a user interface processing unit that performs user interface processing of selecting whether or not to apply the head-related transfer function information to the audio signal in a case where the detection unit detects connection of the reproduction device.

4. The information processing device according to claim 3, wherein the function application unit is capable of executing first application processing of applying the head-related transfer function information corresponding to the user to the audio signal and second application processing of applying standard head-related transfer function information to the audio signal.

5. The information processing device according to claim 4, wherein the user interface processing unit is capable of executing user interface processing of selecting which of the first application processing and the second application processing is executed in a case where connection of the reproduction device is detected.

6. The information processing device according to claim 3, wherein the user interface processing unit is capable of executing user interface processing for allowing the user to experience a sound field constructed by the audio signal to which the head-related transfer function information has been applied.

7. The information processing device according to claim 3, wherein the user interface processing unit is capable of executing user interface processing for performing login processing for the user.

8. The information processing device according to claim 2, wherein the storage unit stores the head-related transfer function information corresponding to the user and the reproduction device in association with each other.

9. The information processing device according to claim 8, wherein the storage unit stores a plurality of combinations of the head-related transfer function information corresponding to the user and the reproduction device.

10. The information processing device according to claim 1, further comprising a user interface processing unit capable of executing user interface processing for switching between an application state in which the head-related transfer function information is applied to the audio signal and a non-application state in which the head-related transfer function information is not applied to the audio signal.

11. The information processing device according to claim 1, further comprising a user interface processing unit capable of executing user interface processing for switching head-related transfer function information corresponding to the user to the head-related transfer function information corresponding to another user.

12. The information processing device according to claim 1, wherein the information processing device is a television receiver including a display unit capable of video display.

13. An information processing device, comprising:

a signal acquisition unit that acquires an audio signal;

a storage unit that stores head-related transfer function information corresponding to a user;

a determination processing unit that determines whether or not the head-related transfer function information corresponding to the user is stored in another information processing device;

a transfer function acquisition unit that acquires the head-related transfer function information corresponding to the user;

a function application unit that applies the head-related transfer function information corresponding to the user to the audio signal;

a transmission processing unit that transmits the audio signal to a reproduction device;

a detection unit that performs connection detection of the reproduction device; and a user interface processing unit that performs user interface processing of selecting whether or not to apply the head-related transfer function information to the audio signal in a case where the detection unit detects connection of the reproduction device, wherein the function application unit is capable of executing first application processing of applying the head-related transfer function information corresponding to the user to the audio signal and second application processing of applying standard head-related transfer function information to the audio signal, wherein the user interface processing unit is capable of executing user interface processing of selecting which of the first application processing and the second application processing is executed in a case where connection of the reproduction device is detected, and wherein the user interface processing unit is capable of executing user interface processing for performing login processing for the user, and user interface processing for allowing the user to experience a sound field constructed by the audio signal generated by the second application processing in a case where the transfer function acquisition unit cannot acquire the head-related transfer function information corresponding to the user specified as a result of the login processing.

14. An information processing device, comprising:

a signal acquisition unit that acquires an audio signal;

a storage unit that stores head-related transfer function information corresponding to a user;

a determination processing unit that determines whether or not the head-related transfer function information corresponding to the user is stored in another information processing device;

a transfer function acquisition unit that acquires the head-related transfer function information corresponding to the user; and a function application unit that applies the head-related transfer function information corresponding to the user to the audio signal a user interface processing unit capable of executing: user interface processing for performing login processing for a user; and user interface processing for displaying, on the display unit, information for causing an application for calculating the head-related transfer function information corresponding to the user to be installed on a user terminal in a case where the head-related transfer function information corresponding to the user specified as a result of the login processing is not stored in the storage unit and cannot be acquired from the another information processing device, wherein the transfer function acquisition unit acquires the head-related transfer function information corresponding to the user calculated on a basis of information transmitted from the user terminal from the another information processing device, and wherein the information processing device is a television receiver including a display unit capable of video display.

15. The information processing device according to claim 14, wherein the transfer function acquisition unit acquires the head-related transfer function information corresponding to the user from the storage unit, and acquires the head-related transfer function information corresponding to the user from the another information processing device in a case where the head-related transfer function information corresponding to the user is not stored in the storage unit.

16. The information processing device according to claim 14, further comprising a transmission processing unit that transmits the audio signal to a reproduction device.

17. The information processing device according to claim 16, further comprising:

a detection unit that performs connection detection of the reproduction device; and a user interface processing unit that performs user interface processing of selecting whether or not to apply the head-related transfer function information to the audio signal in a case where the detection unit detects connection of the reproduction device.

18. The information processing device according to claim 17, wherein the function application unit is capable of executing first application processing of applying the head-related transfer function information corresponding to the user to the audio signal and second application processing of applying standard head-related transfer function information to the audio signal.

19. The information processing device according to claim 18, wherein the user interface processing unit is capable of executing user interface processing of selecting which of the first application processing and the second application processing is executed in a case where connection of the reproduction device is detected.

20. The information processing device according to claim 17, wherein the user interface processing unit is capable of executing user interface processing for allowing the user to experience a sound field constructed by the audio signal to which the head-related transfer function information has been applied.

* * * * *